US 12,335,222 B2

(12) United States Patent
Lewis et al.

(10) Patent No.: US 12,335,222 B2
(45) Date of Patent: *Jun. 17, 2025

(54) PRIVACY ALIGNED AND PERSONALIZED SOCIAL MEDIA CONTENT SHARING RECOMMENDATIONS

(71) Applicant: Google LLC, Mountain View, CA (US)

(72) Inventors: Justin Lewis, Mountain View, CA (US); Ruxandra Georgiana Davies, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/604,363

(22) Filed: Mar. 13, 2024

(65) Prior Publication Data
US 2024/0223527 A1     Jul. 4, 2024

Related U.S. Application Data

(63) Continuation of application No. 18/094,617, filed on Jan. 9, 2023, now Pat. No. 11,936,610, which is a
(Continued)

(51) Int. Cl.
*H04L 51/52* (2022.01)
*G06Q 30/0601* (2023.01)
(Continued)

(52) U.S. Cl.
CPC ......... *H04L 51/52* (2022.05); *G06Q 30/0631* (2013.01); *H04L 51/10* (2013.01); *H04L 65/612* (2022.05)

(58) Field of Classification Search
CPC ......... H04N 21/4668; H04N 21/25891; H04N 21/4532; H04N 21/4826; H04N 21/4788;
(Continued)

(56) References Cited

U.S. PATENT DOCUMENTS 8,949,899 B2    2/2015  Errico et al.
10,554,611 B2   2/2020  Lewis et al.
(Continued)

FOREIGN PATENT DOCUMENTS

CN    103152556        6/2013
CN    104580234 A      4/2015
(Continued)

OTHER PUBLICATIONS

Communication pursuant to Rules 161(1) and 162 EPC from counterpart European Application No. 16745399.2 dated Mar. 16, 2018, 3 pp.
(Continued)

*Primary Examiner* — Barbara B Anyan
(74) *Attorney, Agent, or Firm* — Shumaker & Sieffert, P.A.

(57) ABSTRACT

Systems and methods are provided that facilitate selecting videos to share in a messaging session. A system is provided that includes an accessible data mining component configured to generate a first set of data associated with a messaging session between a user and one or more other user, the first set of data excluding data that is inaccessible to the user and comprising data that is accessible to the user, and an identification component configured to identify a set of media items based on the first set of data. An inaccessible data mining component is further configured to generate a second set of data comprising data that is inaccessible to the user but accessible to at least one of the one or more other users, and a recommendation component configured to recommend a subset of the set of media items to the user based on the second set of data.

18 Claims, 12 Drawing Sheets

Related U.S. Application Data continuation of application No. 16/780,319, filed on Feb. 3, 2020, now Pat. No. 11,552,920, which is a continuation of application No. 14/822,509, filed on Aug. 10, 2015, now Pat. No. 10,554,611.

(51) Int. Cl.
*H04L 51/10* (2022.01)
*H04L 65/612* (2022.01)

(58) Field of Classification Search
CPC ... H04L 67/306; H04L 51/32; H04L 65/1089; H04L 51/10
See application file for complete search history.

(56) References Cited

U.S. PATENT DOCUMENTS

| | | | |
|---|---|---|---|
| 11,552,920 | B2 | 1/2023 | Lewis et al. |
| 2007/0250863 | A1 | 10/2007 | Ferguson |
| 2011/0026898 | A1 | 2/2011 | Lussier et al. |
| 2013/0097176 | A1 | 4/2013 | Khader et al. |
| 2013/0268620 | A1 | 10/2013 | Osminer |
| 2014/0059213 | A1 | 2/2014 | Ollikainen et al. |
| 2014/0067961 | A1* | 3/2014 | Archibong ............ H04L 51/32 709/205 |
| 2014/0156759 | A1 | 6/2014 | Daigle |
| 2016/0094501 | A1* | 3/2016 | Lee .................... H04L 51/10 709/206 |
| 2016/0253710 | A1 | 9/2016 | Publicover et al. |
| 2016/0335686 | A1 | 11/2016 | AthuluruTrumala et al. |

FOREIGN PATENT DOCUMENTS

| | | |
|---|---|---|
| CN | 104756514 | 7/2015 |
| WO | 2010048172 | 4/2010 |

OTHER PUBLICATIONS

Decision to Refuse a European Patent Application dated Mar. 26, 2021 from counterpart EP Patent Application No. 16745399.2.
Examination Report dated Sep. 20, 2019 from counterpart EP Patent Application No. 16745399.2.
International Preliminary Report on Patentability from International Application No. PCT/US2016/044087 dated Feb. 13, 2018, 7 pp.
International Search Report and Written Opinion dated Oct. 4, 2016 in International Patent Application No. PCT/US2016/044087.
Response to Communication pursuant to Article 94(3) EPC dated Sep. 20, 2019, from counterpart European Application No. 16745399.2 filed Jan. 13, 2020, 13 pp.
Response to Communication Pursuant to Rules 161(1) and 162 EPC dated Mar. 16, 2018, from counterpart European Application No. 16745399.2, filed Sep. 21, 2018, 14 pp.
Response to Summons to Attend Oral Proceedings pursuant to Rule 115(1) EPC dated Apr. 22, 2020, including Main Request, from European Patent Application No. 16745399.2, filed Jul. 30, 2020, 20 pp.
Summons to Attend Oral Proceedings dated Apr. 22, 2020 in EP Patent Application No. 16745399.2.
Prosecution History from U.S. Appl. No. 18/094,617 dated Sep. 14, 2023 through Nov. 14, 2023, 30 pp.
Prosecution History from U.S. Appl. No. 16/780,319 dated Nov. 10, 2021 through Sep. 9, 2022, 46 pp.
Prosecution History from U.S. Appl. No. 14/822,509 dated May 19, 2017 through Sep. 19, 2019, 155 pp.

\* cited by examiner

PRIVACY ALIGNED AND PERSONALIZED SOCIAL MEDIA CONTENT SHARING RECOMMENDATIONS

CROSS-REFERENCE TO RELATED APPLICATIONS

This application is a continuation of U.S. patent application Ser. No. 18/094,617, filed Jan. 9, 2023, which is a continuation of U.S. patent application Ser. No. 16/780,319, filed Feb. 3, 2020, which is a continuation of U.S. patent application Ser. No. 14/822,509, filed Aug. 10, 2015, each of which is hereby incorporated by reference herein in its entirety.

TECHNICAL FIELD

This application generally relates to social media sharing and more particularly to systems, methods and computer readable media that facilitate identifying and recommending content for sharing in a social setting based on personal user preferences and privacy settings.

BACKGROUND

Consumers are increasing utilizing social platforms such as content sharing websites and applications, blogs, and social networking websites to share and discuss content on the Internet. This represents the social media phenomenon, which can now significantly impact a business's reputation, sales, and even survival. Not only do users share personal information such as their social backgrounds, their social statuses, opinions on various topics, private photographs and videos, etc., user also share other content they find on the Web. For example, this other content can include links to multimedia (e.g., images, videos, sound files, etc.) provided by a media content provider, links to other websites, links to other applications, lings to articles, links to content items available for purchase, links to advertisements, etc. This type of content sharing is highly encouraged by businesses and content providers because it provides a limitless, economical, and extremely effective mechanism to reach consumers.

In association with sharing content found online in a social setting, users generally share content that they endorse, like or otherwise find interesting or are personally invested in. In addition, users share content in social settings that they think their social peers or friends will also endorse, like, find interesting, etc. Accordingly techniques for automatically identifying and suggesting content for users to share that is both personalized to a user's preferences, and likely to be well received by the user's social peers, are highly valuable.

BRIEF DESCRIPTIONS OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which:

FIG. 1 illustrates an example system that facilitates identifying and recommending content for sharing in a social setting based on personal user preferences and privacy settings in accordance with various aspects and embodiments described herein;

FIG. 2 presents example user interfaces associated with recommending videos to a user for sharing in association with a group messaging session in accordance with various aspects and embodiments described herein;

FIGS. 3A-3B presents example user interfaces associated with providing query results with possible videos for sharing in association with a group messaging session with selecting videos to share in a messaging application in accordance with various aspects and embodiments described herein;

DETAILED DESCRIPTION

Figure 1:
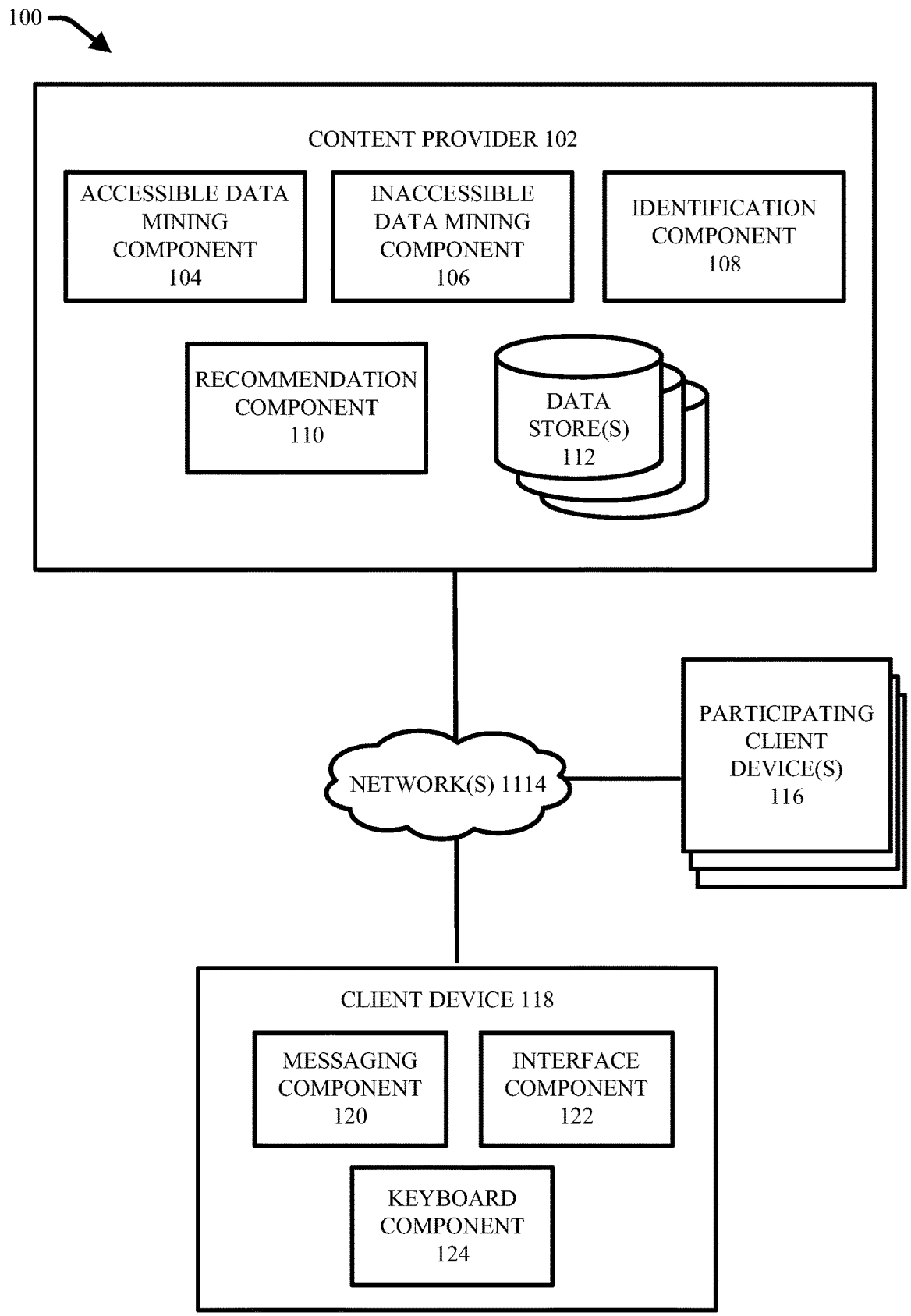

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the disclosed subject matter relates to social media sharing and more particularly to systems, methods and computer readable media that facilitate identifying and recommending content for sharing in a social setting based on personal user preferences and privacy settings. Personalized content recommendations generally involve examining a user's personal content consumption/interaction history with various types of content, such as content the user accesses or views, videos the user watches, content the user searches for, songs the user listens to, content the user endorses (e.g., likes, favorites, subscribes to, etc.), content the user shares, etc. Presenting a user with content recommended for sharing based on a user's personal content consumption history is generally considered non-invasive to the user's privacy because it does not reveal information about the user's personal content consumption/interaction history and preferences to others.

However, user studies have revealed that users find it extremely disturbing when content recommendations provided to their social network friends or followers appear to reveal their private content endorsement and consumption history. In particular, users often associate access control lists with various types of possible user content consumption/interaction actions (e.g., accessing, viewing, watching, endorsing, sharing, etc.) that define and control who can access data regarding the content consumption/interaction actions. Using a user's private content consumption/interaction data to recommend content to another in a manner that reveals the user's private content consumption/interaction data is an infringement of the user's access control settings.

For example, in a social setting involving a small group of users sharing videos with one another, if video recommendations provided to a first user in the group are based on the watch history of a second user in the group, the first user will likely assume that the content videos being recommended to the first user was probably watched or endorsed by another user in the group. If the second user in the group has elected to keep his or her watch history private, (e.g., via an access control setting the user has associated with his or her watch history), than the second user's personal privacy is invaded. For example, the second user, say his name is Michael, could be particularly embarrassed if the first user was recommended a video about a strange or embarrassing topic and the first user shared it to the group with a remark asking "Who in the world would ever watch this video! I bet it was you Michael!"

The subject matter of this disclosure provides techniques for identifying content to recommend to a user for sharing in a social setting involving the user and one or more other users based on personal preferences or content consumption/interaction history of the respective participants and privacy settings of the respective participants (e.g., access control settings). In particular, the subject disclosure provides techniques for recommending content to a user for sharing in a social setting that elegantly leverages personal and private data regarding content interaction and consumption of other users without infringing on access control settings associated with the data.

The type of social setting or context can include any type of electronic communication forum wherein a group of two or more users can share content or links to content (e.g., videos, songs, articles, webpages, goods for sale, etc.) that is accessible to the respective users in the group in via a network environment (e.g., the Internet). For example, the social setting can include but is not limited to: a group chat, (e.g., facilitated by a social networking system), a forum that allows two or more users to post content, a feed that compiles posted content from two or more users, a Web based conferencing session, a group messaging session facilitated by a client application, or a group messaging session facilitated by a short messaging service.

In various exemplary embodiments, the social setting or context involves a group messaging session or chatting session wherein the group members share, discuss, and/or watch videos provided by a streaming media provider. In accordance with these embodiments, the disclosed content recommendation techniques are used to find and recommend other videos to respective users in the group, provided by the streaming media provider, for sharing during the group messaging or chatting session. However, it should be appreciated that the various content recommendation techniques described herein can be applied to recommending other types of content items for sharing in a group environment provided by various other types of content providers (e.g., pictures, sound files, articles, links to webpages, etc.).

In one or more embodiments, systems, methods and computer readable media are provided for creating an ordered list of content items, provided by a content provider, that are recommended for sharing by a user participating in a group messaging or communication session. The ordered list of content items is based on filtering criteria including but not limited to, preferences of the user and the other users, actions the user and the other users have taken in association with consuming/interacting with content provided by the content provider (e.g., viewing, watching, endorsing, sharing, etc.), and access control settings the user and the other users have associated with those actions. The filtering criteria can also include content discussed and/or shared via the messaging session, recency of publication of the content items, popularity of the content items with a wide user population (e.g., all users of the content provider), etc.

Systems, methods and computer readable media are also provided for creating search results including content items provided by a content provider in association with a query initiated by a user in a group messaging or communication setting. For example, the query can be initiated by the user in an effort to find an interesting content item to share to the group. The search results are based on the query key terms, preferences of the user and the other users, actions the user and the other users have taken in association with consuming/interacting with content provided by the content provider (e.g., viewing watching, endorsing, sharing, etc.), and access control settings the user and the other users have associated with those actions. The filtering criteria can also include content discussed and/or shared via the messaging session, recency of publication of the content items, popularity of the content items with a wide user population, etc.

In order to protect a user's private data from other users participating in a group conversation, the disclosed content identification/recommendation systems and methods employ a multiple layer affinity threshold technique. In particular, when identifying content items to recommend (or otherwise present) to a particular user in the group, a set of candidate content items are chosen based on the particular user's private data (such as the particular user's watch history and private endorsements), and data accessible to all users in the group (such as their likes, shares, endorsements, etc.). In addition, the set of candidate content items can also be chosen based on content shared in the messaging session, and search query terms. The candidate content items are then sorted and ranked based on all other data associated with content consumption/interaction by the other participants in the group that is inaccessible to the particular user.

The disclosed techniques for identifying content items to share in a group messaging session or forum are especially interesting because the results depend on the user to which the content items are being recommended and the other users participating in the messaging session. Accordingly, each participant in the messaging session will be presented with a different set of recommended content items to share. This is important because if all users see the same recommended content items for sharing, they will be unlikely to share them to the conversation. In addition the results are tailored to a context of the messaging session, such as the topic being discussed, other content items that are shared during the messaging session, the mood or tone of the conversation, etc. As a result, a single user will be presented with a different set of content items to share for different messaging sessions/forums in which the user participates, even if the participants are the same.

Ultimately, the disclosed techniques provide each user participating in a group messaging session/forum with a dynamic list of content items to share that are relevant to the conversation, unique to each user's personal preferences and content item consumption/interaction history, and likely to be well received by the other participants in the conversation, without revealing the participants private information and infringing on their access control settings. As a result each of the users are likely to continue sharing new content and keep the messaging session/forum flowing and entertaining.

In one or more embodiments, a system is provided that includes an accessible data mining component configured to generate a first set of data associated with a messaging session between a user and one or more other user, the first set of data excluding data that is inaccessible to the user and comprising data that is accessible to the user, and an identification component configured to identify a set of media items provided by a media provider based on the first set of data. The system further includes an inaccessible data mining component configured to generate a second set of data associated with the messaging session, the second set of data comprising data that is inaccessible to the user but accessible to at least one of the one or more other users, and a recommendation component configured to recommend a subset of the set of media items to the user for sharing in association with the messaging session based on the second set of data.

In another aspect, a method is disclosed that includes using a processor to execute the following computer executable instructions stored in a memory to perform the following acts: generating a first set of data associated with a messaging session between a user and one or more other user, the first set of data excluding data that is inaccessible to the user and comprising data that is accessible to the user; identifying a set of media items provided by a media provider based on the first set of data; generating a second set of data associated with the messaging session, the second set of data comprising data that is inaccessible to the user but accessible to at least one of the one or more other users; and recommending a subset of the set of media items to the user for sharing in association with the messaging session based on the second set of data.

Further provided are computer-readable instructions that, in response to execution, cause a computing system to perform operations. These operations can include receiving Referring now to the drawings, FIG. 1 presents an example system 100 that facilitates identifying and recommending content for sharing in a social setting based on personal user preferences and privacy settings in accordance with various aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes content provider 102, client device 118, one or more other client devices 116. In accordance with system 100, content provider 102 and client devices 116 and 118 operate in server/client relationship wherein content provider 102 employs one or more server devices to provide content and/or services to client devices 116 and 118 via a network in response to a request made by the client devices for such content and/or services from the content provider 102. Generally, media provider 102 and client devices 116 and 118 can include memory that stores computer executable components and a processor that executes the computer executable components stored in the memory, examples of which can be found with reference to FIG. 10.

Content provider 102 can include various network based entities configured to provide content and/or services that are accessible to client devices (e.g., client devices 116 and 118) via a website or thin client application employed by the content provider 102. For example, content provider 102 can include a social networking system that provides social networking services and associated content via a website and/or thin client application provided on a user's client device. The social networking system can allow users to establish virtual accounts via which they can build social networks and communicate with other users who share similar interests and backgrounds. For example, many computer network based social networking systems allow users to share ideas, pictures, video, posts, activities, events, and other interests with people in their social network. Such social networking systems can also generate and provide personalized feeds to individual users with feed items that serve as an aggregated and continuous stream of information regarding activity at the social networking system. The social networking system can also facilitate private group messaging or chatting sessions between two or more user via which the respective users can share and discuss content provided by the social networking system or other content providers.

In another aspect, content provider 102 can include an online merchant configured to sell goods or services to users via a website or thin client application. According to this example, during a messaging or conversation forum between a group of two or more users, the users might share and discuss items offered for sale by the merchant. The disclosed content item recommendation techniques could be used to suggest items for sale to the respective users for sharing with the group in association with the messaging forum or session. In another example, content provider 102 can include an information system configured to present pictures, articles, blogs, webpages, etc. or other types of content items to users. According to this example, the content provided by the website or application can be configured for downloading, streaming or merely viewing at a client device (e.g., client device 116 and 118) via the network. In association with the disclosed content item recommendation techniques, during a group communication or messaging forum facilitated by the content provider 102 (e.g., via a community feed or posting board or via a private group chatting application) or another messaging service provider (e.g., a cellular service provider, an electronic messaging service, etc.), respective users could be recommended content items such articles, pictures, blogs, webpages, etc., provided by the content provider 102, for sharing.

In various exemplary embodiments discussed herein in association with identifying and recommending content items to users for sharing in a group social setting, content provider 102 is a steaming media provider configured to provide streamed media to client devices via a network 114. For example, the streaming media provider can have has access to a voluminous quantity (and potentially an inexhaustible number) of shared media (e.g., video and/or audio) files. In some aspects, the streaming media provider can receive media (e.g., user generated content) uploaded thereto by respective users of the streaming media provider and publish the uploaded media to other users. The media provider can further stream these media files to one or more users at their respective client devices (e.g., client devices 116 and 118) using a network accessible platform (e.g., via a website or thin client application). The media can be stored in memory at content/service provider 102 and/or at various other servers or caches employed by the content/service provider 102.

In an aspect, the streaming media provider can facilitate media consumption/interaction at the streaming media provider in a social networking environment. For example, the streaming media provider can include or employ a social networking system via which respective users can establish profiles or accounts with the media provider via which the respective users can connect with other users, communicate with other users and publicize or share information with the other users regarding their media consumption. For example, users can share information regarding videos watched, videos endorsed, channels subscribed to, comments on videos or channels, videos recommended, shared videos, etc. In addition, the streaming media provider can enable users to establish their own channels which serve as avenues via which they share their own media (e.g., media created, collected or otherwise associated with ownership by the user). Other users of the streaming media provider can subscribe to desired channels to receive information regarding the channels, such as new videos added to the channels, recommended videos from the channels, comments provided by other users in association with the channels, etc.

As used herein, the term channel refers to data content available from a common source or data content having a common topic or theme. A channel can be associated with a curator who can perform management actions on the channel. Management actions may include, for example, adding media items to the channel, removing media items from the channel, defining subscription requirements for the channel, defining presentation attributes for channel content, defining access attributes for channel content, etc. The channel content can be digital content uploaded to the internet-based content platform by a channel curator and/or digital content selected by a channel curator from the content available on the Internet-based content platform. A channel curator can be a professional content provider (e.g., a professional content creator, a professional content distributor, a content rental service, a television (TV) service, etc.) or an amateur individual. Channel content can include professional content (e.g., movie clips, TV clips, music videos, educational videos) and/or amateur content (e.g., video blogging, short original videos, etc.). Users, other than the curator of the channel, can subscribe to one or more channels in which they are interested.

The term media content or media item can include but is not limited to streamable media (e.g., video, live video, video advertisements, animations, music, music videos, sound files and etc.) and static media (e.g., pictures, thumbnails). The term media content or media item also includes a collection of media items such as a playlist including several videos or songs, or a channel including several videos or songs associated with a single media creator or curator.

Client devices 116 and 118 can include any suitable computing device associated with a user and configured to receive content and/or services from content provider 102 via a network. For example, a client devices 116 and 118 can include a desktop computer, a laptop computer, a television, an Internet enabled television, a mobile phone, a smartphone, a tablet personal computer (PC), a personal digital assistant PDA, or a wearable computing device. As used in this disclosure, the terms "content consumer" or "user" refer to a person, entity, system, or combination thereof that employs system 100 (or additional systems described in this disclosure) using a client device (e.g., client device 116 or 118).

System 100 is particularly configured to facilitate identifying and recommending content items to users participating in social group messaging setting for sharing. In this context, client devices 116 are referred to as "participating client devices" to denote that they are engage or are engaged in a messaging session with client device 118 (or more conceptually accurate, a user of client device 118). As used herein, the term messaging session refers to an electronic communication of data between two or more users via which the respective users can share various types of content items or links to content items provided by one or more network content providers (e.g., content provider 102) using a messaging application or platform.

A messaging session as described herein can involve the exchange of messages including text, multimedia, and/or voice in a real-time (e.g., instant messaging or chat) or a non real-time (e.g., email, posting to a dynamic forum or feed, etc.) format. For example, a messaging session can include a group messaging session between a plurality of users via a mobile messaging application provided on respective mobile client devices of the plurality of users. The messaging session can include a group chat via which the respective users share and discuss various topics including videos or other types of multimedia provided by content provider 102 (e.g., videos, animations, music, etc.). According to this example, the shared media can be integrated into the group chat as an embedded or attached media object or link to a media object.

The group based messaging session can also enable the respective users to share traditional text based messages with one another. In another example, a messaging session can include an SMS text based messaging session between two or more users or an email exchange between two or more users. In yet another example, a messaging session can include a string of posts between users (e.g., in a chat or non-live format) to a server based messaging board or forum.

In an aspect, client device 118 (and client devices 116) can include a messaging component 120 to establish and facilitate a messaging session between a user of client device 118 and one or more other users at their respective client devices 116. For example, messaging component 120 can facilitate a mobile electronic messaging session between a user of client device 118 and another user or a group of users at their respective client devices 116. In an aspect, the messaging component 120 can facilitate a group chat using a web-based messaging format. In another aspect, the messaging component 120 can facilitate sharing of SMS or MMS messages.

In an aspect, messaging component 120 is provided by a service provider that is not affiliated with content provider 102. For example, messaging component 120 can include a messaging function provided by a social media service provider, a remote messaging service provider, or a cellular service provider. In another aspect, messaging component 120 can be affiliated with and/or provided by media provider 102. For example, where content provider 102 is a streaming media provider, in addition to providing streaming media, content provider 102 can provide a messaging service that enables users to share messages (e.g., in the form of a group chat or messaging forum) with one another regarding media provided by the content provider 102.

According to this aspect, in association with access of media provider 102 using a website platform or mobile application platform of the content provider 102, a user can access and open a messaging application/function provided by the media provider 102. The messaging application/function can allow the user to establish a public or private messaging session with one or more other users for the exchange of messages including videos provided by content provider 102 and/or information representative of videos provided by the content provider 102 (e.g., links to the videos, thumbnails for the videos, etc.). The messages can also include text, symbols, images and/or sound. For example, when a user of client device 118 accesses the content provider 102 via a resident application client for the media provided located on the client device 118, the resident application can include a messaging function that enables a messaging session between the user and one or more other users. According to this example, messaging component 124 can be a function offered by the resident client application for the content provider 102.

In some implementations, messaging component 120 is a media messaging application that enables sharing of messages including media items or data representative of the media items, provided by content provider 102, between two or more users in a messaging format. For example, the messaging component 120 can allow users to share videos provided by the content provider 102, links to videos provided by the content provider 102, or embedded videos provided by the content provider 102 in messages of a messaging session between two or more users. For example, the messaging component 120 can set up and facilitate a group chat between a user of client device 118 and users of client devices 116 wherein messages of the group chat can include videos provided by media provider and/or video references to videos provided by content provider 102.

A video reference can either include but is not limited to: information identifying a video, information identifying a specific point or segment of a video, a link to a video, a playlist a video occurs in, a channel a video occurs in, a thumbnail for a video. For example, using messaging component 120, a user can send a link to a video, provided by content provider 102, in a message of a messaging session between a group of users and identify a segment of the video that the user finds entertaining. In another example, using messaging component 120, a user can send a group message to users of a group messaging session that includes an embedded video provided by content provider 102.

In an aspect, videos provided by the content provider 102 can include short video animations (e.g., from about a few seconds to about ten seconds) that include or do not include sound. These animations can be generated from a longer videos and provide a reference to the longer video. For example, a short video animation associated with a longer video can include a clip of a woman saying a popular quote from a video or a clip of a person performing a funny dance move from a popular dance scene of the video. Such short animations are referred to herein as "Vmojis." Accordingly, rather than sharing a whole video, messaging component 120 can allow a user to share a message that includes a Vmoji.

Client device 118 (and client devices 116) can include an interface component 122 to facilitate generating and presenting a graphical user interface (e.g., interfaces 202, 206, 212, 302, 304, 306, and 308) in association with accessing content provider 102, conducting a messaging session, and/or selecting and receiving (recommended) content items for sharing in association with the messaging session. For example, the graphical user interface can include features that facilitate navigating, consuming and interacting with content (e.g., videos when content provider is a streaming media provider 102) provided by the content provider 102. In some embodiments, the graphical user interface can also facilitate various social networking features provided by the content provider, such as developing social communities with other users, communicating with other users, sharing opinions, thoughts and content provided by the content provider with other users, etc.

In one or more embodiments, client device 118 (and client devices 116), can include also include a keyboard component 124 that facilitates selecting content items, provided by content provider 102, to share with another user or users in association with a group messaging session. According these embodiments, interface component 122 is configured to generate and/or configure a graphical user interface, referred to herein as a "content selection keyboard," that facilitates selecting content items (e.g., videos), provided by the content provider 102, to include in messages of a messaging session and attaching or otherwise including the selected media items or references to the selected media items, in the messages. Example interfaces including a content selection keyboard are described infra with respect to FIGS. 2, 3A and 3B.

In order to facilitate identifying and recommending content items for users participating in a group messaging session to share during the group messaging session, in one or more embodiments, content provider 102 can include accessible data mining component 104, inaccessible data mining component 106, identification component 108 and recommendation component 110. Content provider 102 can also include or have access to one or more data stores 112 including information/data regarding content consumption/interaction actions or activity of users of content provider 102 as well as access control settings the respective users have implemented in association with the actions or activity. The one or more data stores 112 can also include various additional information about the respective users of content provider 102 (e.g., user profile information, precipitated user preference and activity information, etc.) that can facilitate identifying an recommending content items provided by content provider 102 to users for sharing in association with a group messaging session.

The disclosed content item identification and recommendation techniques use both private and public data to recommend content to a user, participating in a group messaging/communication session/forum, for sharing in a largely public manner. As used herein, the term access or accessible when used with respect to data/information refers to a user's ability to view or receive the data/information. Also as used herein, content consumption or interaction refers to an action a user has taken in association with usage of content and/or services provided by content provider 102. These actions naturally can vary depending on the type of content and or services provided by the content provider. However, some exemplary user content consumption/interactions associated with usage of content provider 102 can include but are not limited to: accessing a content item, viewing a content item, searching for a content item, playing a content item (e.g., when the content item is a video, song, sound, Vmoji, etc.), endorsing a content item (which can include marking the content item as liked or favorited, subscribing to the content item, following/tracking the content item, etc.), sharing a content item, commenting on a content item, or purchasing a content item.

In accordance with various aspects and embodiments of the disclosed subject matter, users can establish or implement access control settings that define who (e.g., what other user) are allowed to have access to information regarding various content consumption/interactivity actions or activity of the user in association with content provided by content provider. For example, with reference to a user having an account with a streaming media provider (e.g., when content provider 102 is a streaming media provider), the user can implement access control setting via his or her account regarding what other users can access information regarding the user's watch history, the user's search history, the user's subscriptions, the user's favorited or saved videos or channels, the user's video and channel endorsements, the user's comments on certain videos or channels, the user's video shares, the user's posts or uploads, and various other possible user activity associated with usage of the streaming media provider and/or interaction with media provided by the streaming media provider (e.g., media, provided by the streaming media provider, posted or shared at a source remote to the streaming media provider).

With reference to a singular user in a group of users (e.g., two or more user participating in a group messaging session), private data refers to data regarding the user's content consumption/interaction action that only the singular user has access to based on access control setting implemented by the singular user. For example, in association with consuming and sharing media content provided by a streaming media provider, private data may include the singular user's watch history, and private endorsements of media (e.g., media the user has marked as liked, favorited, subscribed to, saved for watching, etc.).

Public data on the other hand refers to data regarding a user's content consumption/interaction actions that the user has authorized at least one other user to have access to based on access control settings implemented by the user. For example, public data can include information identifying a content item that was privately shared by the user with another user or with a defined group of other users (e.g., the user's friends, the user's closest friends, the user's female friends only, user's Tom, Jerry and Sara only, etc.). In another example, public data can include data shared by the user to any and all users of the media streaming provider.

Continuing with reference to a particular user included in a group of users participating in a group messaging session, accessible data refers to data regarding user content consumption/interaction that the particular user has access to based on access control setting associated with the data. For example, data accessible to the particular user can include the user's private data (e.g., private watch history, private media content endorsements, etc.), as well as public data regarding a content consumption/interaction action another user has performed in association of usage of content provider 102 (e.g., sharing a content item, endorsing a content item, viewing a content item, etc.) that the other user has authorized the particular user to have access to (e.g., based on access control settings implemented by the other user). Likewise, inaccessible data refers to data regarding user content consumption/interaction that the particular user does not have access to based on access control setting associated with the data. For example, data that is inaccessible to the particular user can include other users' private data as well as public data regarding a content consumption/interaction action another user has made (e.g., sharing a content item, endorsing a content item, viewing a content item, etc.) that the other user has not authorized the singular user to have access to.

In association with identifying content items to present or recommend to a particular user for sharing in a group messaging session, accessible data mining component 104 is configured to generate a first set of seed data (e.g., using data included in the one or more data stores 112). This seed data is used by identification component 108 to identify a set of candidate content items that could be recommended or presented to the particular user for sharing. The seed data includes a first set of data associated with the messaging session including data that is accessible to the particular user and excluding data that is inaccessible to the user. In particular, in one or more embodiments, the seed data can include the private content consumption/interaction data of the particular user (such as the particular user's watch history and private endorsements), and additional accessible data of all users in the group, including the particular user (such as their likes, shares, and accessible endorsements, etc.). The seed data can also include information that is public to all users of the group, such as other content items that are shared during the messaging session, text that is shared during the messaging session, a context of the messaging session, a topic of the messaging session, etc. In addition, when the particular user initiates a search for a content item, the seed data can include query terms used in the search.

For example, when content provider 102 is a streaming media provider and the group messaging session involves sharing videos provided by the streaming media provider, the seed data can include a first set of data including but not limited to: other media content provided by the media provider that is shared in the messaging session, activity data related to usage of the media provider by the particular user (e.g., the particular user's private data, such as his watch history, private endorsements, etc.), and endorsement data that is accessible to the particular user and the one or more other users in the group regarding endorsement, by the user or the one or more other users, of media content provided by the media provider. The seed data can also include a variety of other types of data regarding usage of the media provider, and/or interaction with media provided by the media provider, by one or more participants in the group that is accessible to all of the participants. For example, the seed data could include data identifying a content item shared by one user in the group to his social media friends (which includes the participants of the group). In another example, the seed data could include data regarding a comment one of the users in the group made about a video, wherein the one of the users authorized a specific set of social peers to have access to the comment and all the members in the group are included in the specific set of social peers.

The identification component 108 is configured to identify a set of candidate content items provided by the content provider 102 based on the seed data. For example, identification component 108 can find content items based on the particular user's private data, such as content items that the particular user accesses, endorses, subscribes to, etc., and/or other content items related to content items that the particular user accesses, endorses, subscribes to, etc. Similarly, identification component 108 can find content items that one or more other users in the group access, endorse, subscribe to, etc., and/or other content items related to content items that that one or more other users in the group access, endorse, subscribe to, etc., wherein data regarding the respective users content access, endorsement, subscription, etc., is accessible to all users in the group. In addition, identification component 108 can identify content items that are related to other content items shared in the messaging session, text included in the messaging session (e.g., key words), a topic of the messaging session, or other discernible data from the messaging session that indicates the subject matter, tone, and mood of the messaging session.

In association with finding related content items, identification component 108 can employ various existing and potential search techniques, such as finding content items having similar metadata associated therewith, or finding content items that are associated with a similar characteristic (e.g., other videos from the same channel, other videos featuring a particular actor, other videos included in a specific genera, etc.). In another example, identification component 108 can find related videos based on finding a set of users that watch a particular video, and then finding other videos those users tend to watch (e.g., using co-watch signals). For example, the wherein the accessible data mining component can analyze text shared in the messaging session to determine the key words, topics, tone, and other characteristics of the messaging session.

Inaccessible data mining component 106 is configured to generate a second set of protected data associated with the messaging session. This protected data includes data that is inaccessible to the particular user, but accessible to one or more of the other users in the group. For example, the second set of data can include private data of the other users in the group. In another example, the second set of data can include data that is accessible to two or more other users in the group, but not accessible to the particular user. For instance, when the content provider is a streaming media provider, the second set of data can include that is inaccessible to the particular user related to usage of the media provider by the one or more other users (e.g., their private watch histories, private search queries), and endorsement data that is inaccessible to the particular user regarding endorsement, one or more of the other users in the group, of media content provided by the media provider.

Recommendation component 110 is configured to select a subset of the candidate content items to recommend or present to the user based on the second set of protected data. For example, recommendation component 110 can examine the candidate content items and sort, rank and/or filter them based on the second set of data to identify a subset of the candidate content items to recommend that are most relevant to the preferences of the particular user, the preferences of the other users in the group, and the subject matter or context of the messaging session. In another example, recommendation component 110 can examine the candidate content items and sort, rank and/or filter them based on the second set of data to identify a subset of the candidate content items to recommend that are most relevant to the preferences of the particular user, the preferences of the other users in the group, the subject matter or context of the messaging session, and one or more query search terms provided by the particular user. According to this example, the recommendation component 110 can return a search query result with candidate content items (e.g., as opposed to a recommendation list). The various mechanisms via which the candidate content items are sorted, filtered and ranked are discussed in greater detail infra with respect to FIGS. 4-6.

Because the second set of protected data is inaccessible to the particular user, it is not used to find candidate content items to recommend to the particular user. However, it can be used to rank, sort and/or filter the set of candidate content items identified based on the seed data. As a result, candidates are not choose based on data that is inaccessible to the particular user, such as private data of other users in the group. Thus the chance of a content item (e.g., video) that a user in the group privately watched or endorsed becoming a content item that is recommended to another user in the group for sharing has a low probability.

Figure 2:
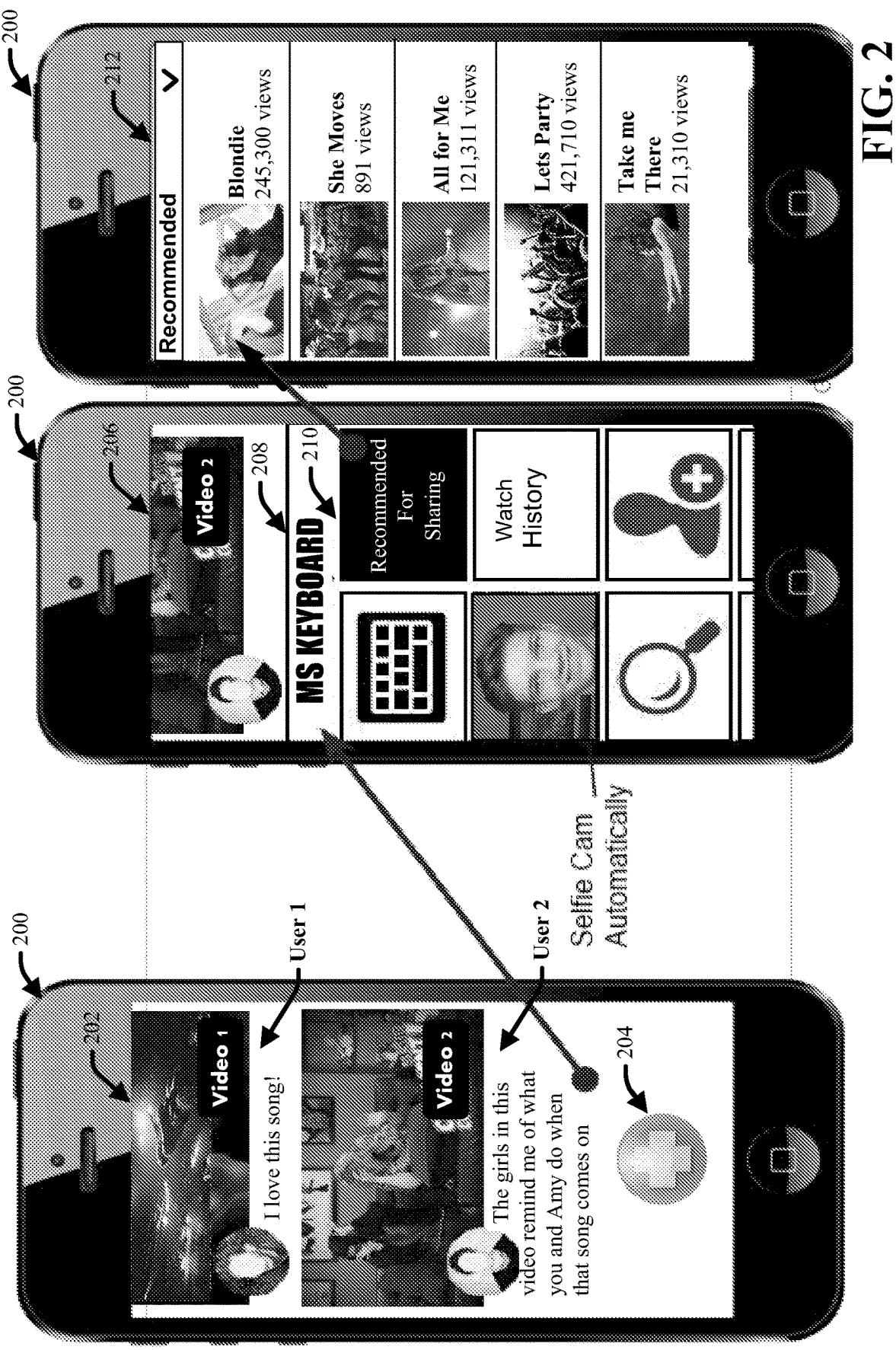

FIG. 2 presents a series of graphical user interfaces 202, 206 and 212 displayed on a mobile device 200 in association with a group messaging session that involves sharing videos provided by a streaming media provider (e.g., content provider 102), accordance with aspects and embodiments described herein. In an aspect, client device 200 include one or more of the components of client device 118. For example, the various interfaces presented on the client device 200 can be generated, presented, and/or facilitated by messaging component 120, interface component 122, and/or keyboard component 124. Repetitive description of like elements employed in respective embodiments disclosed herein is omitted for sake of brevity.

Interface 202 presents a messaging session interface wherein a messaging session is established between at least two users, identified as user 1 and user 2. The messaging session facilitates sharing and discussing media. For example, user 1 has shared a video, video 1, and user 2 has shared a video, video 2, during the messaging session. In an aspect, video 1 and video 2 are embedded videos provided by an external media provider (e.g., content provider 102). For exemplary purposes, user 1 is the owner/user of employing client device 200.

Messaging session interface 202 further includes an add media button 204. Selection of the add media button by user 1 results in the generation/presentation of interface 206. Interface 206 includes a media selection (MS) keyboard 208. The MS keyboard 208 facilitates selecting media (provided by the external media provider) for sharing with other users via the messaging session. The MS keyboard 208 can include various menu options, including a type text/keyboard option, a recommended for sharing section 210, a selfie camera tool, a view watch history tool, a search tool, and an "add user" to the conversation tool.

In an embodiment, the recommended for sharing section 210 corresponds to media items selected by recommendation component 110 for sharing in association with the messaging session in accordance with the various aspects and embodiments described herein. Interface 212 corresponds to a graphical user interface that is produced in response to selection of the recommended for sharing section 201. As seen in interface 212, several videos are presented to user 1 in a list format that have been determined good candidates to share by user 1 during the messaging session based on the various criteria described herein. Selection of one of the videos from the list can result in sharing a third video to the conversation.

Figure 3A:
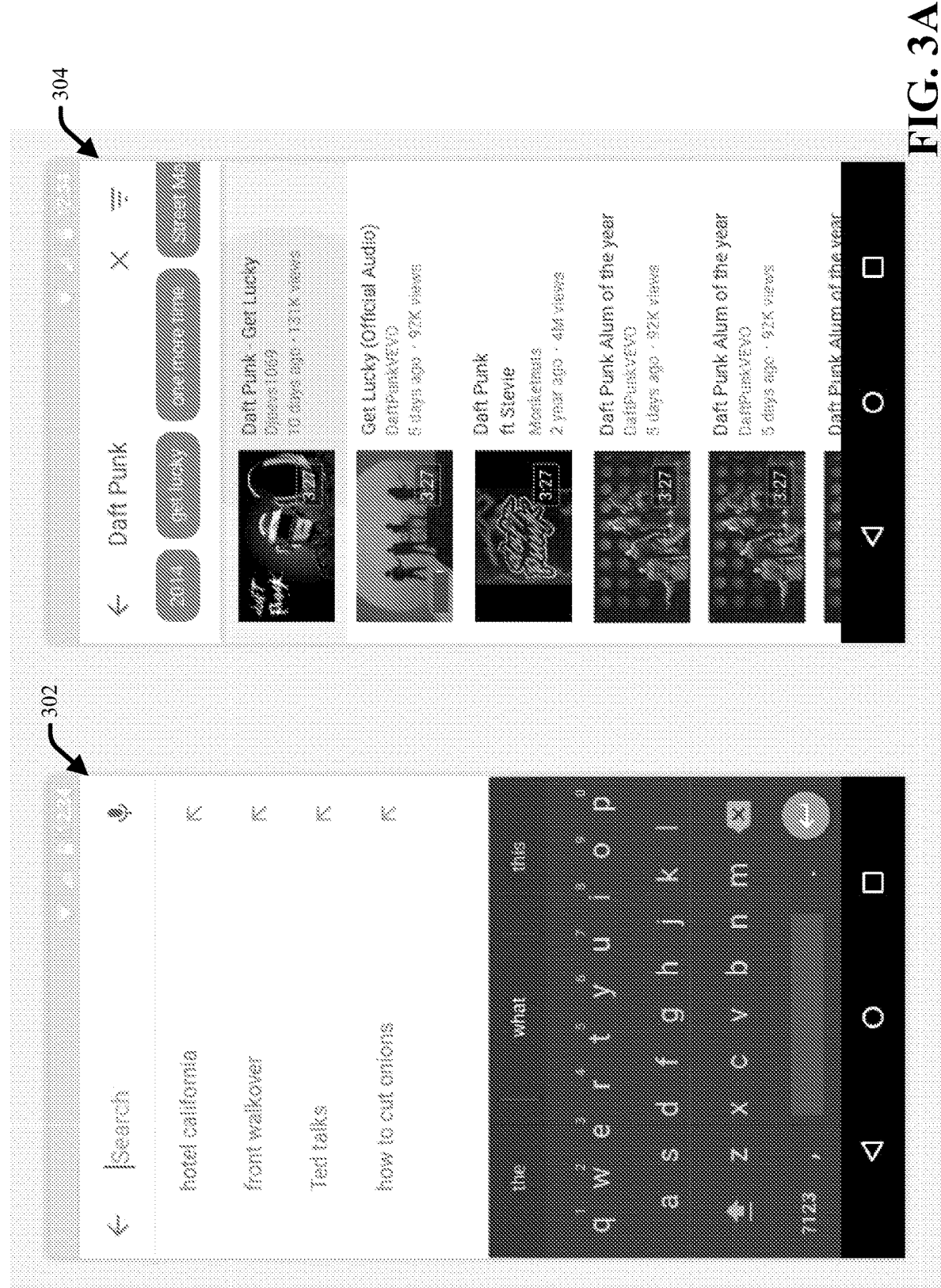
Figure 3B:
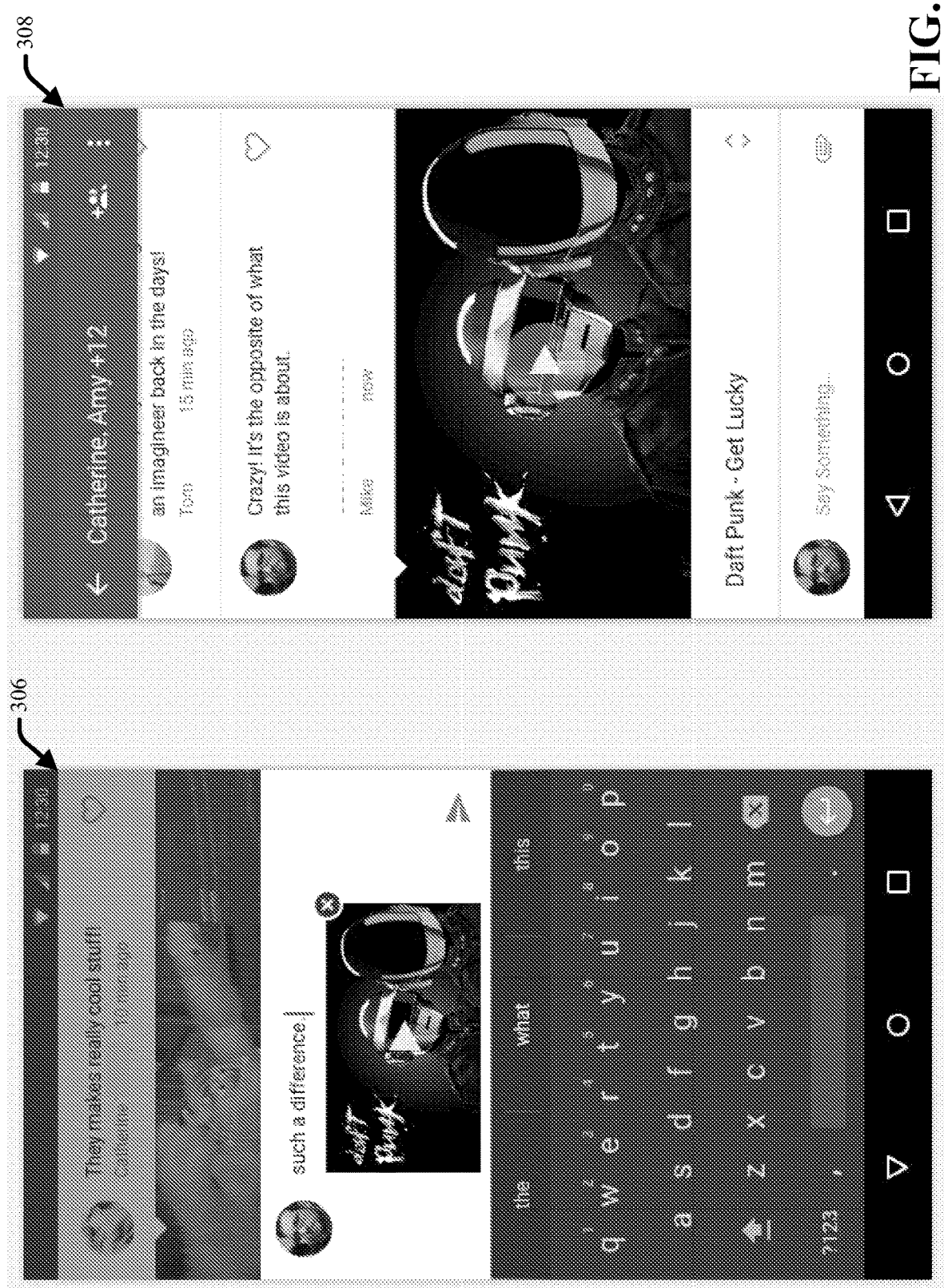

FIGS. 3A and 3B present another series of graphical user interfaces 302, 304, 306 and 308 that can be displayed on a client device (e.g., client devices 116 and 118) in association with a group messaging session that involves sharing videos provided by a streaming media provider (e.g., content provider 102), accordance with aspects and embodiments described herein. Repetitive description of like elements employed in respective embodiments is omitted for sake of brevity.

Interface 302 presents a search tool that facilitates searching for videos to share in a messaging session. For example, interface 302 can be presented in response to selection of a search icon (not shown). The search tool allows the user to input key terms associated with a video that the user is interested in sharing (e.g., via text using the standard keyboard or voice input). The key terms currently presented below the search tool bar can include key terms the user recently searched and/or key terms related to the current messaging session that are auto-populated by the content provider and/or the client device (via analyzing text and/or shared media of the current messaging session).

Interface 304 presents a set of search results that are presented to the user based in part on the key words "Draft Punk." In an embodiment, the search results are selected and presented by recommendation component 110 in accordance with the various aspects and embodiments disclosed herein. For example, in addition to determining the search results based on the key words "Draft Punk," a set of candidate videos were identified by identification component 108 based on data that is accessible to the user and all other users in the group messaging session. The recommendation component 110 then selected a subset of the candidate videos based on data that is inaccessible to the user but accessible to at least one of the other users in the group.

Interface 306 presents an example preview interface that includes a video selected by the user from the search results for sharing to the group messaging session. The preview interface also allows the user to add text to a message including the video in association with sharing the video. Interface 308 shows the group messaging session interface after the video and the associated message are posted thereto.

Figure 4:
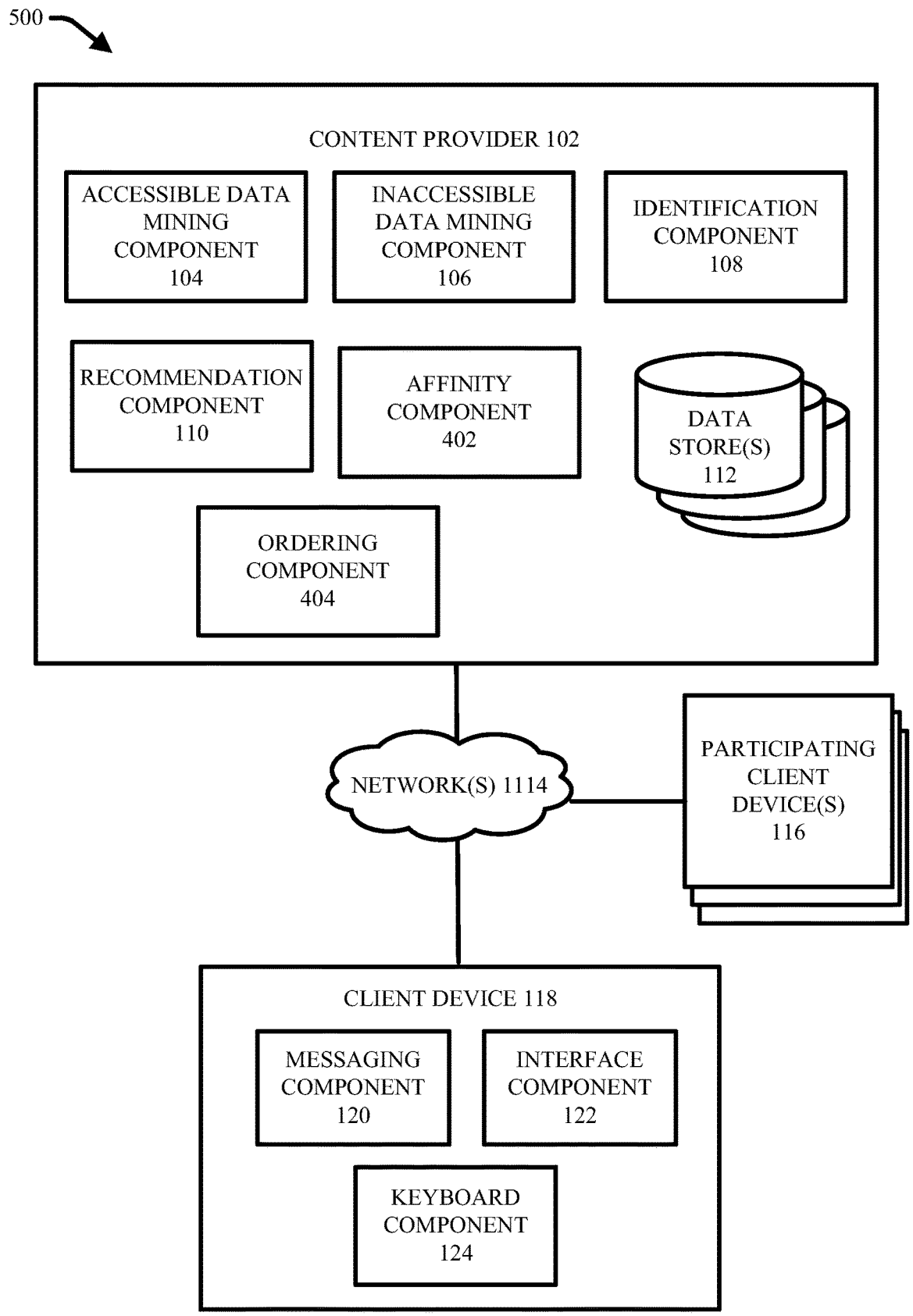
FIG. 4 illustrates another example system that facilitates identifying and recommending content for sharing in a social setting based on personal user preferences and privacy settings in accordance with various aspects and embodiments described herein.

FIG. 4 resents another example system 400 that facilitates identifying and recommending content for sharing in a social setting based on personal user preferences and privacy settings in accordance with various aspects and embodiments described herein. System 400 includes same or similar features and functionality as system 100 with the addition of affinity component 402 and ordering component 404. Repetitive description of like elements employed in respective embodiments is omitted for sake of brevity.

A primary purpose of the subject mechanisms of identifying content to recommend to a particular user participating in a group messaging session for sharing during the group messaging session is to suggest content that the whole group would enjoy or find entertaining or interesting, that particular user has a personal affinity for, and that is relevant to the current subject matter/tone of the messaging session (e.g., the topic currently being discussed). In order to facilitate achieving these goals, affinity component 402 is configured to determine affinity scores to associate with candidate content items identified by identification component 108 that reflect affinities the respective messaging session participants have for the candidate content items. Recommendation component 110 can the select a subset of the candidate content items based on the affinity scores respectively association therewith (e.g., the recommendation component 110 can select candidate content items associated with higher user affinity).

In an aspect, the affinity component 402 is configured to determine affinity scores for each of the candidate content items included in a set of candidate content items that represent the collective affinity the other users in the group, (aside from the particular user for which the recommendation is being made) for each of the content items, based on the second set of data. In particular, the affinity component 402 can use information regarding the others users' private watch histories, private endorsements, private subscriptions, private queries, etc. to determine a score for each candidate content item (e.g., video) that represents how much the other users collectively "like" the content item or how "popular" the content item is with the other users in the group. In addition, the affinity component 402 can use public data associated with each of the other users, that the particular user does not have access to (e.g., wherein this type of data is also included in the second set of protected data but not the first set of seed data). For example, the affinity component 402 can employ data identifying content items that one or more of the other users shared with friends outside the group, data identifying a content item one of the other users endorsed or commented on and allowed others users to know about it, (such as user included in the group and/or excluded from the group), but did not allow the particular user to know about it.

In another aspect, affinity component 402 can determine affinity scores for each of the candidate content items that reflects a degree of a affinity the particular user has for each of the content items based on the first set of data. In yet another aspect, affinity component 402 can determined combined affinity scores for each of the candidate content items that reflects a measure of the particular user's affinity for the content item and the collective affinity the other users in the group have for the content item. Still in yet another aspect, in association with recommending content items for the particular user to share in response to one of the group members comments, the affinity component 402 can specifically determine first affinity scores reflective of the commenting user's affinity for each of the candidate content items based on the second set of data, and the second affinity scores that reflect the particular user's affinity for each of the content items. The affinity component 402 can also determine a combined affinity score for each of the content items that is based on both of the first and second affinity scores.

Regardless of whether the affinity component 402 is determining an affinity score for a candidate content item based on the first set of seed data or the second set of protected data, the affinity component 402 can employ same or similar mechanisms to calculate a user's affinity for a content item.

In one embodiment, in order to determine a user's affinity for a media item, such as a video, the affinity component 402 can determine the type and degree of interaction the user has had with the media item. For instance, the user may have endorsed the media item, commented on the media item, saved the media item as a favorite, watched the media item, shared the media item, etc. or performed a combination of the actions relative to these actions. According to this example, some actions can be weighed more heavily than others as measure of the user's affinity for the media item. For example, when a user likes or favorites the media item, this activity can be considered a stronger indication of user affinity for the media item as opposed to simply watching the media item or saving it for watching later. In addition, the great the degree of activity the user has with the content item, the higher affinity the user is deemed to have for the media item. For example, if a user watches a media item, shares it and likes it, or even more, watches it multiple times, this activity can result in association of the media item with a higher affinity score than if the user simply commented on the media item or watched it once.

According to this embodiment, if a user has not had any interaction or association with the content item, his or her affinity for the content item may be considered low. For example, after a set of candidate content items are chosen based on the first set of seed data, affinity component can 402 employ the second set of protected data to determine the type of interaction and degree of interaction the other users in the group have had with each of the candidate content items. With respect to a particular candidate content item, if based on the second set of data the affinity component 402 determines that a low number (e.g., none or one) of the other users in the group have interacted with the content item (e.g., endorsed the content item, watched the content item, shared the content item, etc.), the content item can receive a low affinity score reflective of the degree of affinity the other users in the group have for the content item. The particular user's affinity for the content item can also be based on his or her interaction with the content item.

In another embodiment, even if a user, (including the particular user to which content items are being recommend and the other users in the group), has not demonstrated an existing interaction with content item, the affinity component 402 can determine the user's affinity for the content item by first, identifying a set of users of the content provider 102 having similar content consumptions preferences as the user. For example, with respect to a streaming media provider, the affinity component 402 can look at the user's watch history and find a set of other users of the streaming media provider (e.g., from the entire sample of users of the streaming media provider) with similar watch histories. The affinity component 402 can then determine a number of the users in the set that have also watched or endorsed the candidate content item. The greater this number the higher the affinity score for the candidate content item. For example, if it is determined that many users of the streaming media provider that have similar watch histories have watch and liked the candidate media item, the is a high probability that the user will also like it upon seeing it.

In yet another embodiment, when determining a user's affinity for a particular candidate video, the affinity component 402 can determine a channel the candidate video is associated with. The affinity component 402 can then determine whether the user has subscribed to the channel, engaged with the channel, watched other videos from the channel, etc. to infer a degree of affinity the user will have for the video when the user has not yet come across the video. In other words, the more invested the use is with the channel, the higher affinity the user will be considered to have in the candidate video that is also from that channel.

Ordering component 404 is configured to order a set of candidate content items based on the affinity scores associated therewith. For example, ordering component 404 can order those candidate content items demonstrating a higher user affinity score over those having a lower user affinity score. In various embodiments, the recommendation component 110 is configured to identify a subset of candidate content items to recommend to a user based on their ordered ranking. For example, the recommendation component 110 can select the top 5, the top 10, etc. In another example, the recommendation component 110 can include all the candidate content items in a recommendation list, yet provide them in the order determined by ordering component 404. This way, the user will scan through the suggested content items that are deemed the best candidates first before reaching lower ranked candidate content items.

Figure 5:
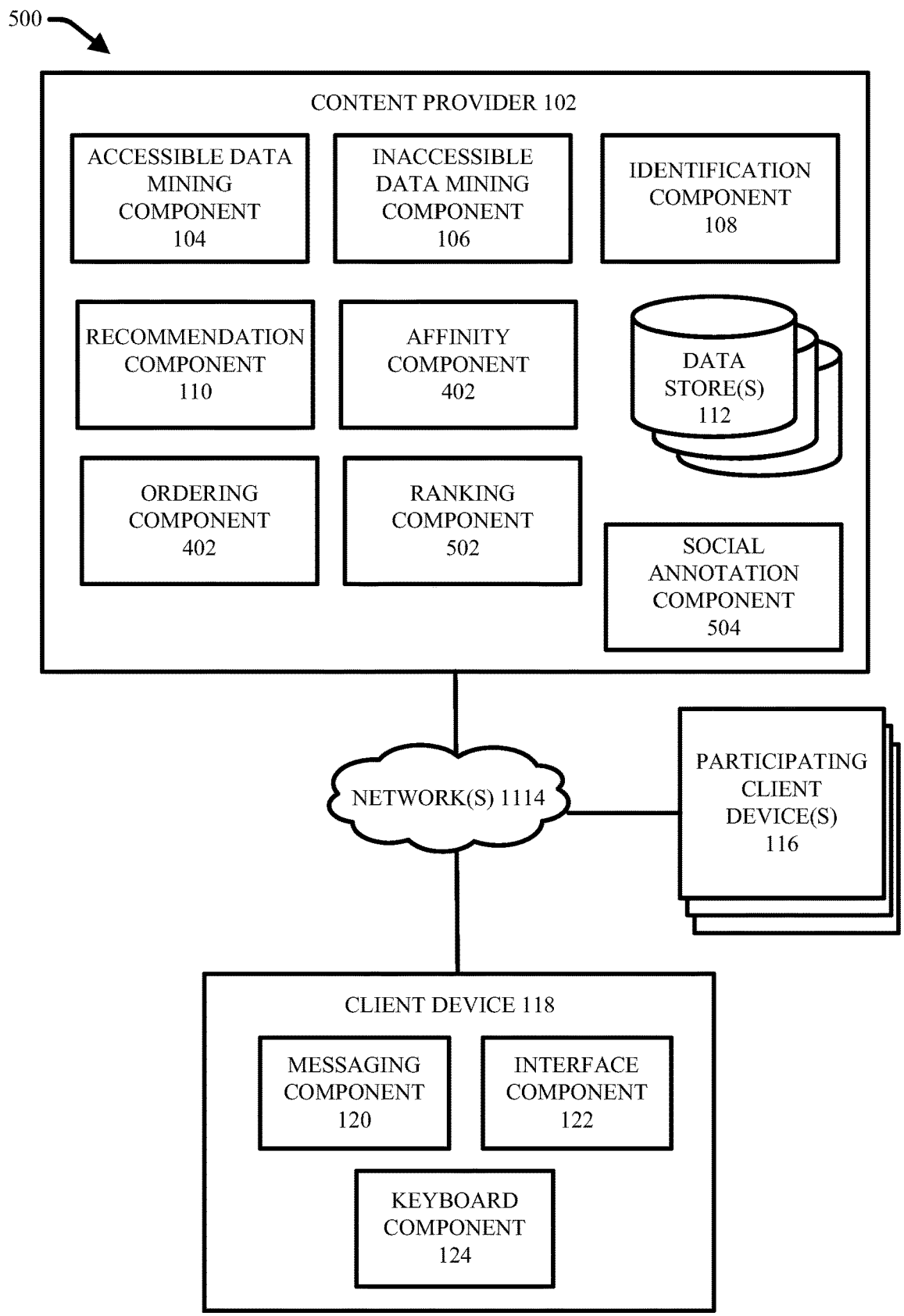
FIG. 5 illustrates another example system that facilitates identifying and recommending content for sharing in a social setting based on personal user preferences and privacy settings in accordance with various aspects and embodiments described herein.

FIG. 5 resents another example system 500 that facilitates identifying and recommending content for sharing in a social setting based on personal user preferences and privacy settings in accordance with various aspects and embodiments described herein. System 400 includes same or similar features and functionality as system 400 with the addition of ranking component 502 and social annotation component 504. Repetitive description of like elements employed in respective embodiments is omitted for sake of brevity.

In various embodiments, the ranking component 502 is configured to rank candidate media items to based on one or more factors in association with selecting a subset of the candidate content items to recommend or present to a particular user participating in a group messaging session for sharing. In an aspect, the ranking component 502 is configured to rank the respective candidate content items based on their associated affinity scores determined by affinity component 402 to reflect a degree to which the content provider considers the respective content items to be liked and shared by the particular user. According to this aspect, the affinity scores can be based on the particular user's content consumption/interaction activity with the content provider. This information is generally included in the first set of seed data. The ranking component 502 can also rank the respective candidate content items based on other affinity scores determined for the restive content items that reflect a degree to which the other participants in the messaging session like (or otherwise find entertaining, interesting, etc.) the respective candidate content items. These other affinity scores will be primarily based on the second set of protected data.

In association with these embodiments, ranking component 502 can rank candidate videos using the second set of protected data based on how many of the other group participants have watched, endorsed, shared, commented on, and/or otherwise provided an indication of affinity for the respective candidate videos. Those videos that seem to be more popular with a majority of the group members will thus be ranked higher. The ranking component 502 can also employ the first set of data and the second set of data to determine co-watch signals between the particular user and the other users in the group. For example, the ranking component 502 can identify candidate videos that have been watched by the particular user and also watched by one or more of the other members of the group. Those videos that have been watched by the particular user and a greater number of the other users will be ranked higher than those with fewer or weaker co-watch signals.

In some aspects, recommendation component 110 is configured to identify a subset of candidate content items that are considered the best to include by the particular user in a response to a specific comment, question, or share made by another user in the group, wherein the group includes three or more total participants. According to these aspects, the ranking component 502 can weight this other user's affinity towards the candidate content items higher than rest of the participants in the group when ranking the respective candidate content items.

The ranking can also reflect a degree to which content provider considers the respective candidate content items relevant to the messaging session in general and/or relevant to a current topic or set of comments/shares of the messaging session. According to this aspect, ranking component 502 can employ information included in the first set of seed data regarding other content items that have already been shared in the messaging session, key words included in the messaging session, a topic of the messaging session, and a tone or mood of the messaging session. The ranking component 502 can then determine or infer a relevancy score for the respective content items based on these factors. For example, with respect to videos, the ranking component 502 can rank videos having content characteristics (e.g., based on metadata associated therewith regarding a title of the video, a genera of the video, a length of the video, a channel associated with the video, semantic content of the video, actors appearing in the video, an artist associated with the video, etc.) that are similar to other videos that have already been shared, key words extracted from the messaging session, the topic of the messaging session, and the tone of the messaging session. When a query is initiated by the particular user, ranking component 502 can also rank respective candidate content items based on relevancy to the query terms employed.

In addition, ranking component 502 can rank respective candidate content items based on general popularity of the content items with users of the content provider and recency of publication/hype regarding the respective content items. For example, ranking component 502 can rank candidate videos that are currently trending or popular amongst the content provider's users (e.g., based on number of views, shares, etc.) higher than other videos considered not as popular. In another example, ranking component 502 can rank videos that have been recently watched, shared, endorsed, etc., by the other users in the group higher than those that were watched, shared, endorsed, etc., at a later time. In accordance with this example, ranking component 502 can employ the second set of protected data to determine factors regarding recency of watching, interaction, and/or endorsements of respective candidate content items by the other members of the group.

Recommendation component 110 is further configured to select a subset of candidate content items based on their rankings. For example, those candidate content items having a ranking above a threshold ranking can be recommended, or the top N (e.g., 5, 10, etc.) candidate content items can be recommended.

Social annotation component 504 is configured to apply social annotations to recommended content items when available. In particular, in order to increase the likelihood users share recommended content items in group conversations, a "recommendation source" can be used to decorate the recommended content items. This recommendation source can be any public user behavior from the participants that relates to the content item and had a positive effect on the likelihood of recommendation of that content item. For example a source recommendation might be "This video is recommended because both you and John liked 'The fox and the hound'" or "This video is recommended because John shared 'Red fish blue fish' with you and Tyler." The user seeing the socially annotated action should always have access to seeing the annotated action.

In an aspect, after a particular subset of content items has been identified for recommending to a user (e.g., via identification component 108) for sharing with the group messaging session, social annotation component 504 is configured to determine whether information regarding activity of any of the other users in the group toward the content item (e.g., endorsing, watching, sharing, commenting, etc.) is included in the first set of seed data (e.g., because it is accessible to all of the group participants). If so, the social annotation component 504 is configured to use this data to apply a social annotation to the recommended content item. The social annotation can identify the particular users that have endorsed (or watched, shared, etc.) the content item and the type of activity the other users have performed in association with endorsing the content item. For example, the social annotation can include a short phrase stating that "Amy, John, and Tom have all liked this video!" In some embodiments, the social annotation can also be presented with the content item if and when it is selected for sharing with the group.

Figure 6:
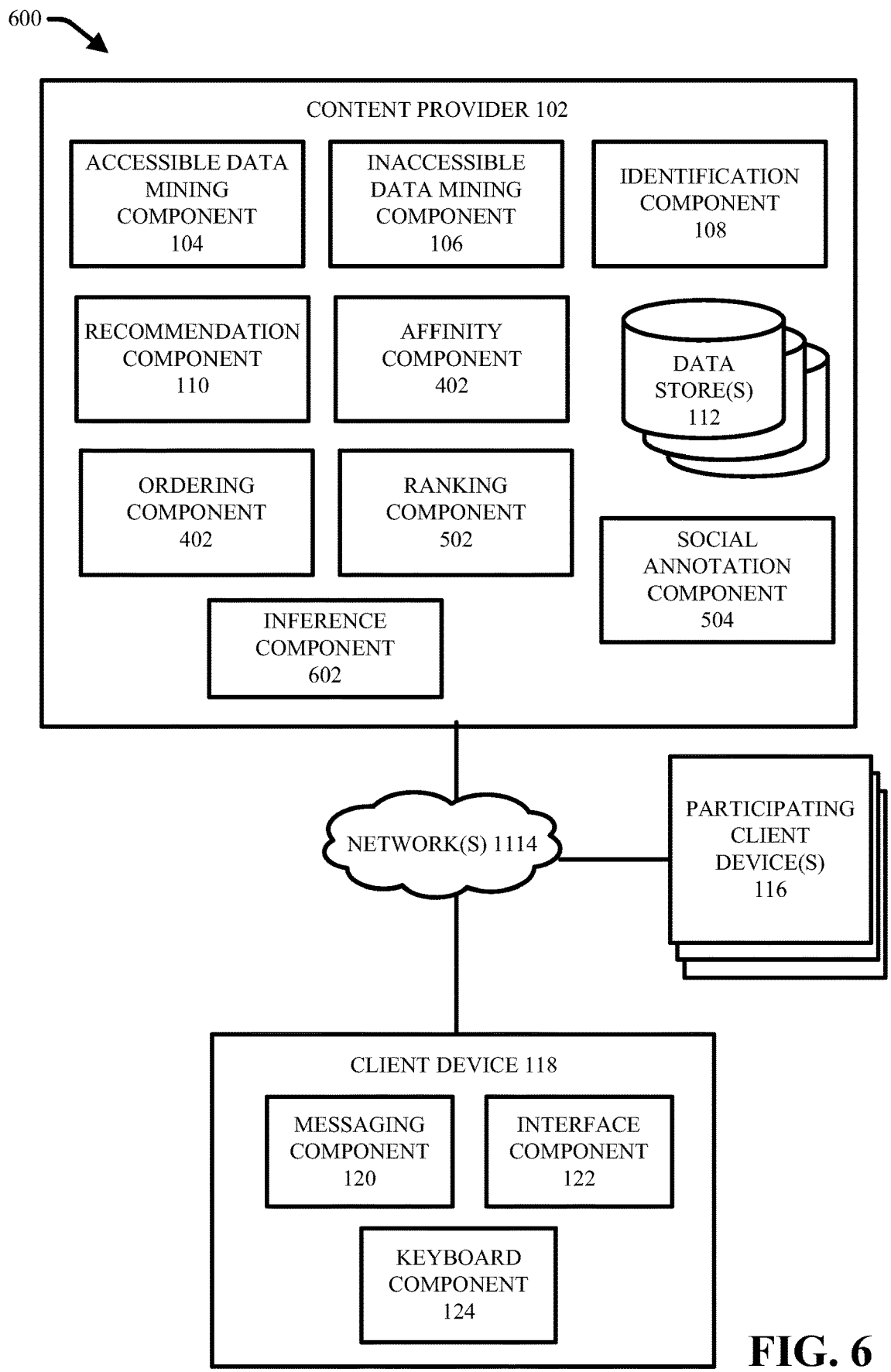
FIG. 6 illustrates another example system that facilitates identifying and recommending content for sharing in a social setting based on personal user preferences and privacy settings in accordance with various aspects and embodiments described herein.

FIG. 6 resents another example system 600 that facilitates identifying and recommending content for sharing in a social setting based on personal user preferences and privacy settings in accordance with various aspects and embodiments described herein. System 600 includes same or similar features and functionality as system 500 with the addition of inference component 602. Repetitive description of like elements employed in respective embodiments is omitted for sake of brevity.

Inference component 602 is configured to provide for or aid in various inferences or determinations associated with aspects system 600. For example, inference component 602 can facilitate affinity component 402 in association with determine affinity scores for content items that reflect a degree to which a user has an affinity for the content item. Inference component 602 can also facilitate ranking component 504 with ranking media items to reflect a degree of suitability for sharing by a particular user participating in a messaging session given the other participants and the context of the messaging session.

In order to provide for or aid in the numerous inferences described herein, inference component 602 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
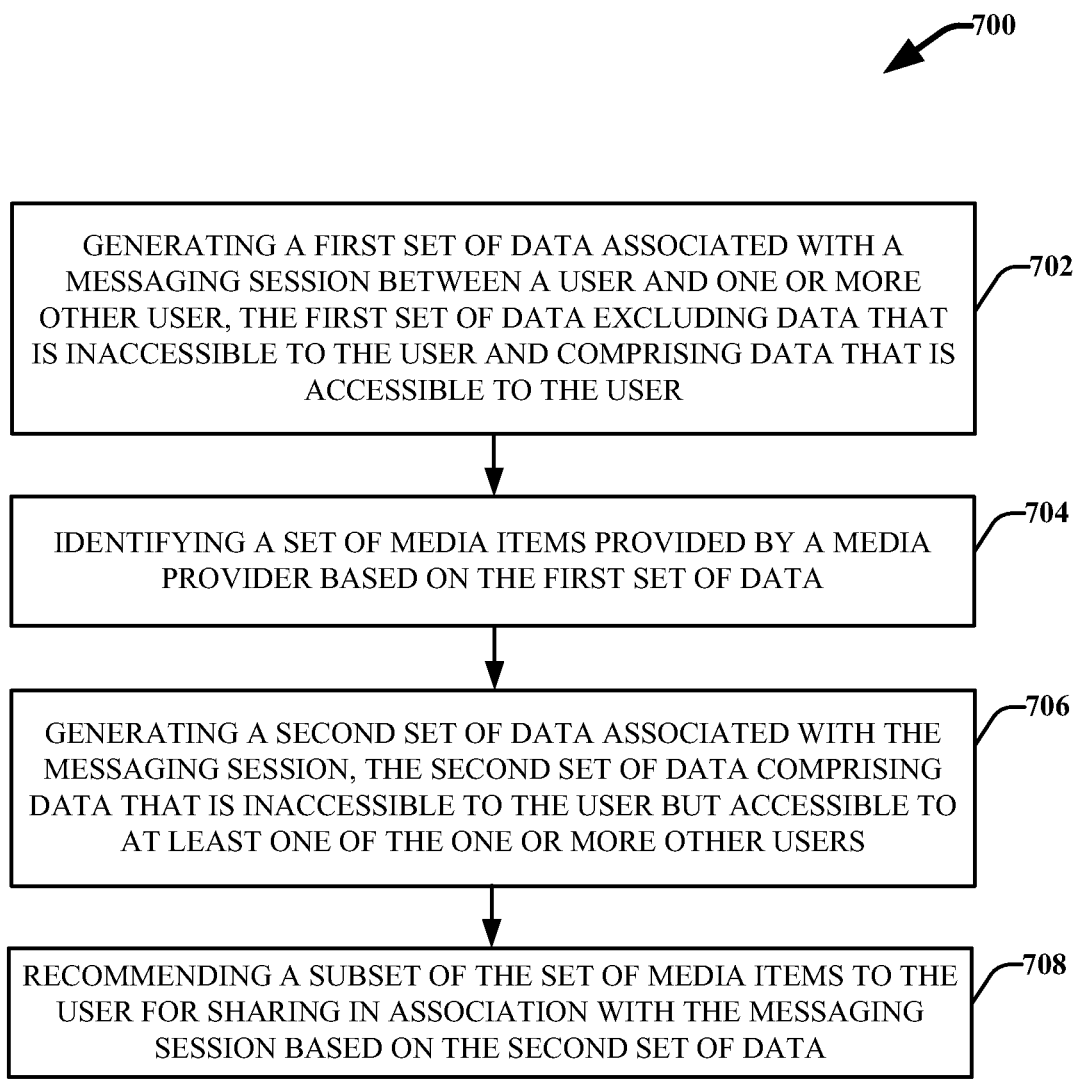
FIG. 7 is a flow diagram of an example method for identifying and recommending content for sharing in a social setting based on personal user preferences and privacy settings in accordance with various aspects and embodiments described herein.
Figure 8:
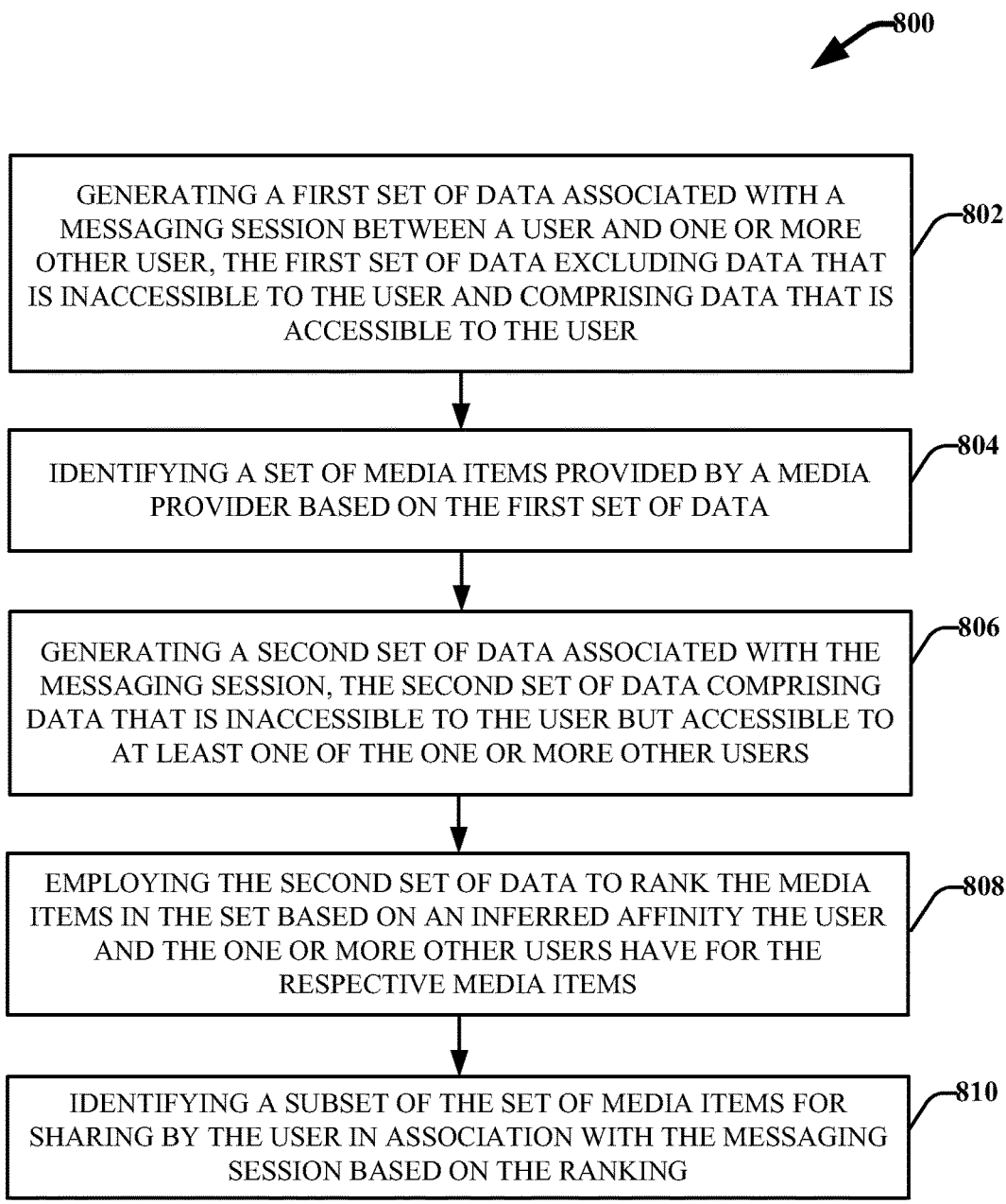
FIG. 8 is a flow diagram of another example method for identifying and recommending content for sharing in a social setting based on personal user preferences and privacy settings in accordance with various aspects and embodiments described herein.
Figure 9:
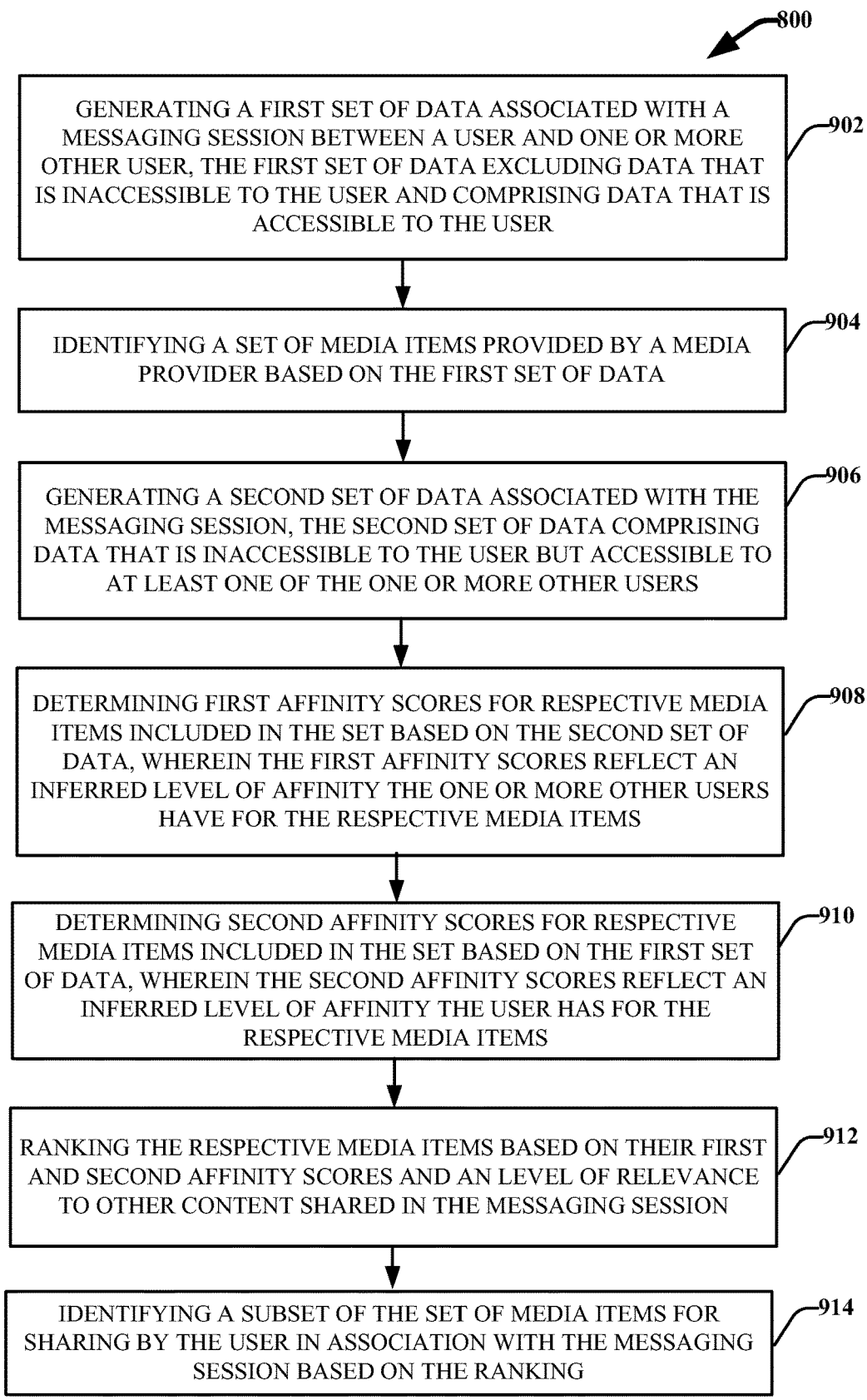
FIG. 9 is a flow diagram of another example method for identifying and recommending content for sharing in a social setting based on personal user preferences and privacy settings in accordance with various aspects and embodiments described herein.

In view of the example systems and/or devices described herein, example methods that can be implemented in accordance with the disclosed subject matter can be further appreciated with reference to flowcharts in FIGS. 7-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 7 illustrates a flow chart of an example method 700 for identifying and recommending content for sharing in a social setting based on personal user preferences and privacy settings in accordance with various aspects and embodiments described herein. At 702, a first set of data associated with a messaging session between a user and one or more other user is generated (e.g., via accessible data mining component 104). The first set of data excludes data regarding content consumption/interaction by the other users in the group that is inaccessible to the user and including content consumption/interaction data that is accessible to the user, such as private content/consumption interaction data of the user and content consumption/interaction data of any member of the group that is public or accessible to all members of the group. At 704, a set of media items provided by a media provider are identified based on the first set of data (e.g., via identification component 108). At 706, a second set of data associated with the messaging session is generated (e.g., via inaccessible data mining component 106). The second set of data comprising data that is inaccessible to the user but accessible to at least one of the one or more other users. Then at 708, a subset of the set of media items is recommended to the user for sharing in association with the messaging session based on the second set of data (e.g., via recommendation component 108).

FIG. 8 illustrates a flow chart of an example method 800 for identifying and recommending content for sharing in a social setting based on personal user preferences and privacy settings in accordance with various aspects and embodiments described herein. At 802, a first set of data associated with a messaging session between a user and one or more other user is generated (e.g., via accessible data mining component 104). The first set of data excludes data regarding content consumption/interaction by the other users in the group that is inaccessible to the user and including content consumption/interaction data that is accessible to the user, such as private content/consumption interaction data of the user and content consumption/interaction data of any member of the group that is public or accessible to all members of the group. At 804, a set of media items provided by a media provider are identified based on the first set of data (e.g., via identification component 108). At 806, a second set of data associated with the messaging session is generated (e.g., via inaccessible data mining component 106). The second set of data comprising data that is inaccessible to the user but accessible to at least one of the one or more other users.

At 808, the second set of data is employed to rank the media items in the set based on an inferred affinity the user and the one or more other users have the respective media items (e.g., via ranking component 502). Then at 810, a subset of the set of media items for sharing by the user in association with the messaging session is identified based on the ranking (e.g., via recommendation component 108).

FIG. 9 illustrates a flow chart of an example method 900 for identifying and recommending content for sharing in a social setting based on personal user preferences and privacy settings in accordance with various aspects and embodiments described herein. At 902, a first set of data associated with a messaging session between a user and one or more other user is generated (e.g., via accessible data mining component 104). The first set of data excludes data regarding content consumption/interaction by the other users in the group that is inaccessible to the user and including content consumption/interaction data that is accessible to the user, such as private content/consumption interaction data of the user and content consumption/interaction data of any member of the group that is public or accessible to all members of the group. At 904, a set of media items provided by a media provider are identified based on the first set of data (e.g., via identification component 108). At 906, a second set of data associated with the messaging session is generated (e.g., via inaccessible data mining component 106). The second set of data comprising data that is inaccessible to the user but accessible to at least one of the one or more other users.

At 908, first affinity scores are determined for respective media items included in the set based on the second set of data (e.g., via affinity component 402). The first affinity scores reflect an inferred level of affinity the one or more other users have for the respective media items. At 910, second affinity scores are determined for respective media items included in the set based on the first set of data (e.g., via affinity component 402). The second affinity scores reflect an inferred level of affinity the user has for the respective media items. At 912, the respective media items in the set are ranked based on the first and second affinity scores and a level of relevance to other content (e.g., media content and text content) shared in the messaging session (e.g., via ranking component 502). Then at 914, a subset of the set of media items is identified for sharing by the user in association with the messaging session based on the ranking.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 10:
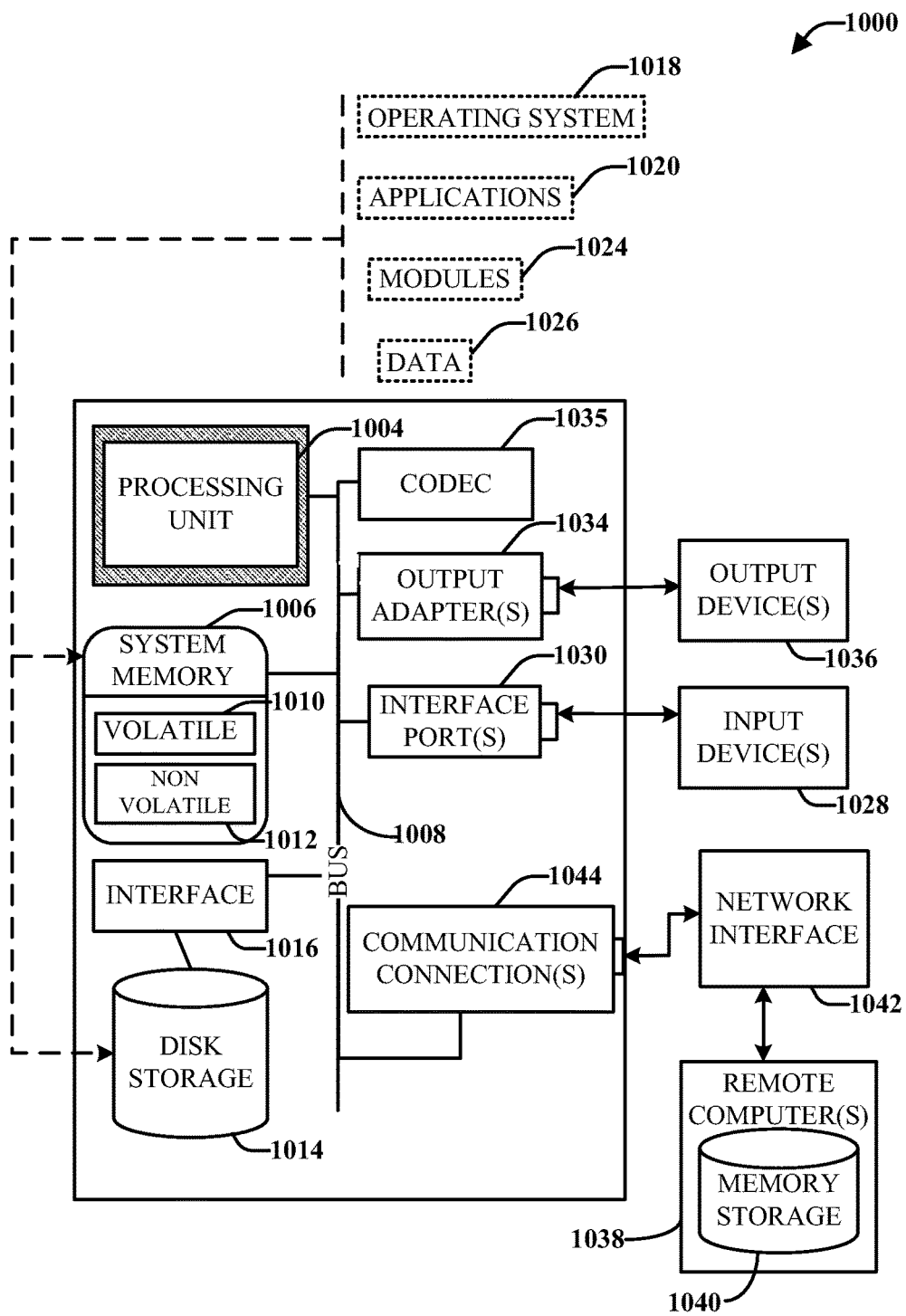
FIG. 10 is a schematic block diagram illustrating a suitable operating environment in accordance with various aspects and embodiments.

With reference to FIG. 10, a suitable environment 1000 for implementing various aspects of the claimed subject matter includes a computer 1002. The computer 1002 includes a processing unit 1004, a system memory 1006, a codec 1005, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 13104), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. In addition, according to present innovations, codec 1005 may include at least one of an encoder or decoder, wherein the at least one of an encoder or decoder may consist of hardware, a combination of hardware and software, or software. Although, codec 1005 is depicted as a separate component, codec 1005 may be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s). Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
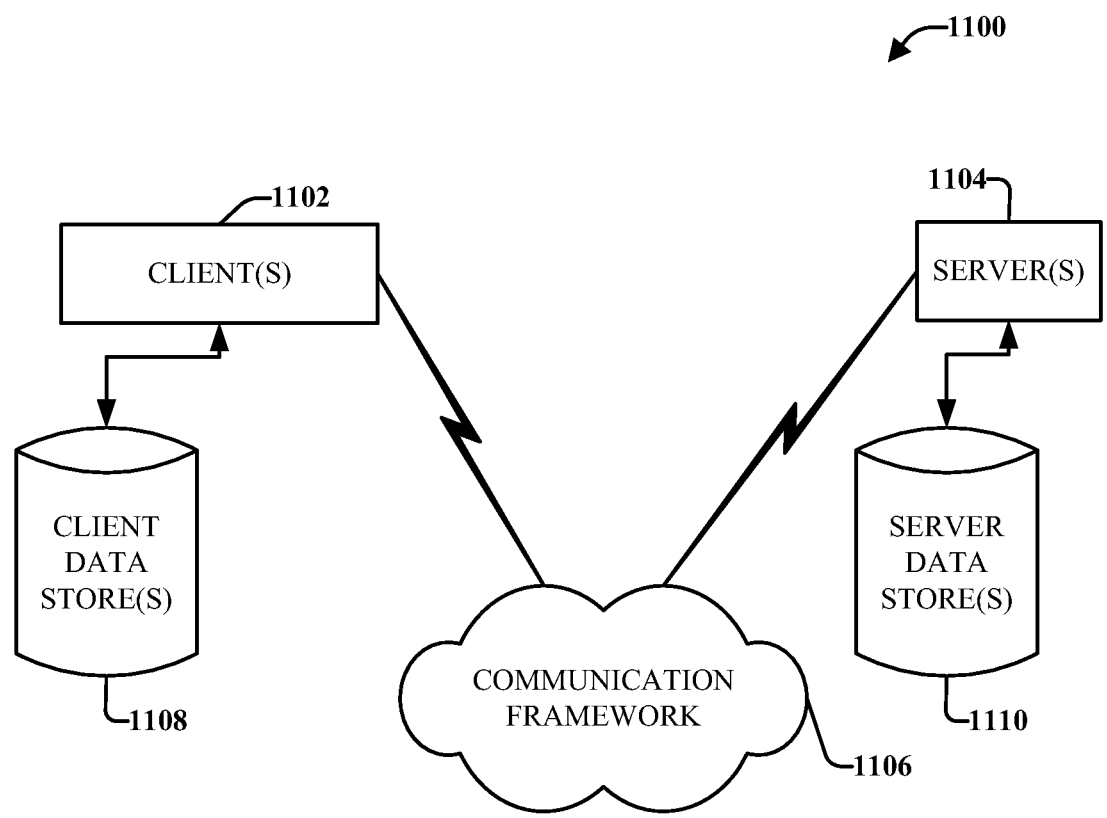
FIG. 11 is a schematic block diagram of a sample-computing environment in accordance with various aspects and embodiments.

Referring now to FIG. 11, there is illustrated a schematic block diagram of a computing environment 1100 in accordance with this disclosure. The system 1100 includes one or more client(s) 1102 (e.g., laptops, smart phones, PDAs, media players, computers, portable electronic devices, tablets, and the like). The client(s) 1102 can be hardware and/or software (e.g., threads, processes, computing devices). The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet transmitted between two or more computer processes wherein the data packet may include video data. The data packet can include a metadata, e.g., associated contextual information, for example. The system 1100 includes a communication framework 1106 (e.g., a global communication network such as the Internet, or mobile network(s)) that can be employed to facilitate communications between the client(s) 1102 and the server(s) 1104.

Communications can be facilitated via a wired (including optical fiber) and/or wireless technology. The client(s) 1102 include or are operatively connected to one or more client data store(s) 1108 that can be employed to store information local to the client(s) 1102 (e.g., associated contextual information). Similarly, the server(s) 1104 are operatively include or are operatively connected to one or more server data store(s) 1110 that can be employed to store information local to the servers 1104.

In one embodiment, a client 1102 can transfer an encoded file, in accordance with the disclosed subject matter, to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media. The term article of manufacture, as used in this disclosure, is intended to encompass a computer program accessible from any computer-readable device or storage media.

What is claimed is:

1. A method comprising:
    providing, using a hardware processor, a graphical user interface including a search tool that facilitates searching for media content for a first user to share;
    receiving, via the search tool, a first user input including key terms associated with media content that the first user is interested sharing;
    identifying, using the hardware processor, access control parameters set by a second user regarding what users are authorized to access regarding media content provided by a media provider;
    generating, using the hardware processor, a first set of data associated with a group messaging session based on the key terms, wherein the first set of data is generated to include first user account history data and to exclude second user account history data, wherein the first user account history data includes account history data of the first user that is inaccessible to the second user, and wherein the second user account history data includes account history data of the second user that is inaccessible to the first user; and
    identifying, using the hardware processor, a set of video items provided by a media provider based on the first set of data.

2. The method of claim 1, wherein the first set of data includes one or more of:
    media content provided by the media provider that is shared in the group messaging session,
    user activity data related to usage of the media provider by the first user, and
    endorsement data regarding endorsement of media content provided by the media provider by the first user or one or more other users included in the group messaging session, wherein the endorsement data includes indications of media content provided by the media content provider that the first user or the one or more other users have endorsed that is accessible to the first user and the one or more other users included in the group messaging session.

3. The method of claim 1, wherein the first set of data includes one or more of: search history of the first user, indications of content posted or shared by the first user, and subscriptions of the first user.

4. The method of claim 1, further comprising:
    generating a second set of data associated with the group messaging session, wherein the second set of data includes user account history data associated with one or more other users included in the group messaging session;
    identifying a subset of the set of video items based on the second set of data; and
    updating the graphical user interface in which the subset of the set of video items are available for selection by the first user for sharing in the group messaging session.

5. The method of claim 4, wherein the second set of data includes one or more of: user activity data that is inaccessible to the first user related to usage of the media provider by one or more other users included in the group messaging session, and endorsement data regarding endorsement of media content provided by the media provider by one or more of the other users included in the group messaging session, wherein the endorsement data includes indications of media content provided by the media content provider that the second user has endorsed that is inaccessible to the first user included in the group messaging session.

6. The method of claim 1, wherein the second user account history data includes media content posted or shared by the second user at a source remote to the media provider.

7. A system comprising:
    a hardware processor; and
    memory storing instructions that, when executed by the hardware processor, cause the hardware processor to:

provide a graphical user interface including a search tool that facilitates searching for media content for a first user to share;

receive, via the search tool, a first user input including key terms associated with media content that the first user is interested sharing;

identify access control parameters set by a second user regarding what users are authorized to access regarding media content provided by a media provider;

generate a first set of data associated with a group messaging session based on the key terms, wherein the first set of data is generated to include first user account history data and to exclude second user account history data, wherein the first user account history data includes account history data of the first user that is inaccessible to the second user, and wherein the second user account history data includes account history data of the second user that is inaccessible to the first user; and identify a set of video items provided by a media provider based on the first set of data.

8. The system of claim 7, wherein the first set of data includes one or more of: media content provided by the media provider that is shared in the group messaging session, user activity data related to usage of the media provider by the first user, and endorsement data regarding endorsement of media content provided by the media provider by the first user or one or more other users included in the group messaging session, wherein the endorsement data includes indications of media content provided by the media content provider that the first user or the one or more other users have endorsed that is accessible to the first user and the one or more other users included in the group messaging session.

9. The system of claim 7, wherein the first set of data includes one or more of: search history of the first user, indications of content posted or shared by the first user, and subscriptions of the first user.

10. The system of claim 7, further comprising instructions that when executed by the hardware processor cause the hardware processor to:
generate a second set of data associated with the group messaging session, wherein the second set of data includes user account history data associated with one or more other users included in the group messaging session;
identify a subset of the set of video items based on the second set of data; and
update the graphical user interface in which the subset of the set of video items are available for selection by the first user for sharing in the group messaging session.

11. The system of claim 10, wherein the second set of data includes one or more of: user activity data that is inaccessible to the first user related to usage of the media provider by one or more other users included in the group messaging session, and endorsement data regarding endorsement of media content provided by the media provider by one or more of the other users included in the group messaging session, wherein the endorsement data includes indications of media content provided by the media content provider that the second user has endorsed that is inaccessible to the first user included in the group messaging session.

12. The system of claim 7, wherein the second user account history data includes media content posted or shared by the second user at a source remote to the media provider.

13. A non-transitory computer-readable medium encoded with computer executable instructions that, when executed by at least one processor, cause the at least one processor to:

provide a graphical user interface including a search tool that facilitates searching for media content for a first user to share;

receive, via the search tool, a first user input including key terms associated with media content that the first user is interested sharing;

identify access control parameters set by a second user regarding what users are authorized to access regarding media content provided by a media provider;

generate a first set of data associated with a group messaging session based on the key terms, wherein the first set of data is generated to include first user account history data and to exclude second user account history data, wherein the first user account history data includes account history data of the first user that is inaccessible to the second user, and wherein the second user account history data includes account history data of the second user that is inaccessible to the first user; and identify a set of video items provided by a media provider based on the first set of data.

14. The non-transitory computer-readable medium of claim 13, wherein the first set of data includes one or more of: media content provided by the media provider that is shared in the group messaging session, user activity data related to usage of the media provider by the first user, and endorsement data regarding endorsement of media content provided by the media provider by the first user or one or more other users included in the group messaging session, wherein the endorsement data includes indications of media content provided by the media content provider that the first user or the one or more other users have endorsed that is accessible to the first user and the one or more other users included in the group messaging session.

15. The non-transitory computer-readable medium of claim 13, wherein the first set of data includes one or more of: search history of the first user, indications of content posted or shared by the first user, and subscriptions of the first user.

16. The non-transitory computer-readable medium of claim 13, further encoded with computer executable instructions that, when executed by the processor, cause the processor to:
generate a second set of data associated with the group messaging session, wherein the second set of data includes user account history data associated with one or more other users included in the group messaging session;
identify a subset of the set of video items based on the second set of data; and
update the graphical user interface in which the subset of the set of video items are available for selection by the first user for sharing in the group messaging session.

17. The non-transitory computer-readable medium of claim 16, wherein the second set of data includes one or more of: user activity data that is inaccessible to the first user related to usage of the media provider by one or more other users included in the group messaging session, and endorsement data regarding endorsement includes indications of media content provided by the media content provider that the second user has endorsed that is inaccessible to the first user included in the group messaging session by one or more of the other users included in the group messaging session, wherein the endorsement data includes indications of media content provided by the media content provider that the second user has endorsed that is inaccessible to the first user included in the group messaging session.

18. The non-transitory computer-readable medium of claim 13, wherein the second user account history data includes media content posted or shared by the second user at a source remote to the media provider.

* * * * *